US010348396B2

(12) United States Patent
Olson

(10) Patent No.: US 10,348,396 B2
(45) Date of Patent: Jul. 9, 2019

(54) LOW EARTH ORBIT SATELLITE CONSTELLATION SYSTEM FOR COMMUNICATIONS WITH RE-USE OF GEOSTATIONARY SATELLITE SPECTRUM

(71) Applicant: Theia Group, Incorporated, Philadelphia, PA (US)

(72) Inventor: Erlend Olson, Newport Beach, CA (US)

(73) Assignee: Theia Group, Incorporated, Philadelphia, PA (US)

( * ) Notice: Subject to any disclaimer, the term of this patent is extended or adjusted under 35 U.S.C. 154(b) by 12 days.

(21) Appl. No.: 15/585,818

(22) Filed: May 3, 2017

(65) Prior Publication Data

US 2018/0343055 A1 Nov. 29, 2018

Related U.S. Application Data

(60) Provisional application No. 62/331,245, filed on May 3, 2016.

(51) Int. Cl.
*H04B 7/185* (2006.01)
*H04B 7/195* (2006.01)
(Continued)

(52) U.S. Cl.
CPC .............. *H04B 7/195* (2013.01); *B64G 1/10* (2013.01); *H04B 7/185* (2013.01);
(Continued)

(58) Field of Classification Search
CPC .... H04B 7/195; H04B 7/185; H04B 7/18513; H04B 7/18521; H04B 7/18523;
(Continued)

(56) References Cited

U.S. PATENT DOCUMENTS 5,410,728 A * 4/1995 Bertiger ............ H04B 7/18521
455/13.1
5,552,920 A * 9/1996 Glynn ............... H04B 7/18504
342/352
(Continued)

OTHER PUBLICATIONS

OneWeb Non-Geostationary Satellite System, Attachment A, "Technical Information to Supplement Schedule S", to WorldVu Satellites Limited, Petition for a Declaratory Ruling Granting Access to the U.S. Market for the OneWeb System, IBFS File No. SAT-LOI-20160428-00041 (filed Apr. 28, 2016).

*Primary Examiner* — Hai V Nguyen
(74) *Attorney, Agent, or Firm* — Bonini IP Law LLC; Frank J. Bonini, Jr.

(57) ABSTRACT

A system for re-using GEO-allocated communications spectrum in a LEO satellite constellation based communications system, such that the LEO satellite originated signals will not appear in the beam-width of GEO-pointed earth station antennas, and satellites configured to provide communications by manipulating their respective beam transmissions, which may include a forward beam and rearward beam whose angles are controlled to project the beam and reduce or eliminate the potential for interference with GEO-pointed earth station antennas. The system and LEO satellites may provide substantially 100% coverage of an earth station located anywhere on the surface of the earth, without coordination with the GEO satellites or GEO-pointing ground stations. The system also may provide earth stations that are configured to enhance the isolation between the GEO communications system and the LEO communications system using the same spectrum to reduce the potential for GEO-pointed earth station antennas from picking up the LEO communication.

93 Claims, 20 Drawing Sheets

(51) Int. Cl.
*B64G 1/10* (2006.01)
*H04B 7/19* (2006.01)
*H04W 84/06* (2009.01)

(52) U.S. Cl.
CPC ........... *H04B 7/18523* (2013.01); *H04B 7/19* (2013.01); *H04W 84/06* (2013.01)

(58) Field of Classification Search
CPC ........ H04B 7/15; H04W 84/06; H04W 84/18; B64G 1/66; B64G 1/1007; B64G 1/1085
USPC .................................................... 455/12.1
See application file for complete search history.

(56) References Cited

U.S. PATENT DOCUMENTS

| | | | | |
|---|---|---|---|---|
| 5,566,354 A * | 10/1996 | Sehloemer | ......... | H04B 7/18539 455/13.1 |
| 5,604,920 A * | 2/1997 | Bertiger | ............ | H04B 7/18521 455/13.1 |
| 5,867,783 A * | 2/1999 | Horstein | .............. | B64G 1/1007 455/12.1 |
| 6,019,318 A * | 2/2000 | Cellier | ................. | B64G 1/1007 244/158.4 |
| 6,126,116 A * | 10/2000 | Cellier | ................. | B64G 1/1007 244/158.4 |
| 6,175,340 B1 * | 1/2001 | Olds | ........................ | H01Q 3/08 343/824 |
| RE37,140 E * | 4/2001 | Schloemer | ......... | H04B 7/18539 455/12.1 |
| 6,325,332 B1 * | 12/2001 | Cellier | ................. | B64G 1/1007 244/158.4 |
| 6,556,828 B1 * | 4/2003 | Carlin | ..................... | H04B 7/19 370/319 |
| 6,678,520 B1 * | 1/2004 | Wang | ................. | H04B 7/18513 455/13.1 |
| 6,701,126 B1 * | 3/2004 | Draim | .................. | B64G 1/1085 455/12.1 |
| 6,714,521 B2 * | 3/2004 | Draim | .................. | B64G 1/1085 370/316 |
| 6,940,452 B2 * | 9/2005 | Munoz | ................... | H01Q 1/288 342/359 |
| 7,136,620 B2 * | 11/2006 | Wang | ................. | H04B 7/18513 455/13.1 |
| 7,184,761 B1 * | 2/2007 | Wang | ..................... | H04B 7/195 342/372 |
| 7,200,360 B1 * | 4/2007 | Chang | ................. | H04B 7/18504 455/13.1 |
| 7,369,847 B1 * | 5/2008 | Rosen | .................. | H04B 7/2041 342/155 |
| 7,480,506 B2 * | 1/2009 | Wang | ..................... | H04B 7/195 342/372 |
| 7,620,394 B2 * | 11/2009 | Good | ................. | H04B 7/18563 340/10.1 |
| 7,624,948 B2 * | 12/2009 | Goodzeit | ............. | B64G 1/1007 244/164 |
| 7,627,284 B2 * | 12/2009 | Wang | ................. | H04B 7/18513 455/13.1 |
| 7,669,803 B2 * | 3/2010 | Goodzeit | ............. | B64G 1/1007 244/158.4 |
| 7,832,688 B2 * | 11/2010 | Goodzeit | ............. | B64G 1/1007 244/158.4 |
| 7,946,533 B2 * | 5/2011 | Goodzeit | ............. | B64G 1/1007 244/158.4 |
| 8,023,939 B2 * | 9/2011 | Good | ................. | H04B 7/18563 370/225 |
| 8,107,875 B2 * | 1/2012 | Miller | .................. | H04B 7/2041 455/3.02 |
| 8,193,975 B2 * | 6/2012 | Zheng | ................... | H01Q 3/2605 342/354 |
| 8,442,519 B2 * | 5/2013 | Cruz | .................. | H04B 7/18506 455/431 |
| 8,576,769 B2 * | 11/2013 | Zheng | .................... | H04B 7/086 370/316 |
| 9,077,428 B2 * | 7/2015 | Tronc | ................. | H04B 7/18521 |
| 9,356,358 B2 * | 5/2016 | Chang | ..................... | H01Q 3/04 |
| 9,461,733 B2 * | 10/2016 | Tronc | ................. | H04B 7/18513 |
| 9,763,167 B2 * | 9/2017 | Gopal | ................. | H04W 40/246 |
| 9,847,829 B2 * | 12/2017 | Tronc | ................. | H04B 7/18513 |
| 9,859,973 B2 * | 1/2018 | Tronc | ................. | H04B 7/18521 |
| 9,942,082 B2 * | 4/2018 | Noerpel | .................. | H04L 27/36 |
| 9,945,952 B2 * | 4/2018 | Arcidiacono | ............ | G01S 5/02 |
| 10,084,531 B2 * | 9/2018 | Feria | ................... | H04B 7/18513 |
| 2002/0041328 A1 * | 4/2002 | LeCompte | ........... | G01C 11/025 348/144 |
| 2002/0132577 A1 * | 9/2002 | Draim | .................. | B64G 1/1085 455/12.1 |
| 2002/0136191 A1 * | 9/2002 | Draim | .................. | B64G 1/1085 370/344 |
| 2002/0150060 A1 * | 10/2002 | Montpetit | .......... | H04B 7/18521 370/316 |
| 2005/0143005 A1 * | 6/2005 | Moore, III | ......... | H04B 7/18521 455/13.1 |
| 2006/0189309 A1 * | 8/2006 | Good | ................. | H04B 7/18563 455/427 |
| 2007/0117509 A1 * | 5/2007 | Wang | ..................... | H04B 7/195 455/12.1 |
| 2008/0181108 A1 * | 7/2008 | Hashmi | .................. | H04L 47/10 370/231 |
| 2009/0093213 A1 * | 4/2009 | Miller | ................ | H04B 7/18528 455/12.1 |
| 2009/0286467 A1 * | 11/2009 | Miller | ................ | H04B 7/18543 455/3.02 |
| 2010/0015971 A1 * | 1/2010 | Good | ................. | H04B 7/18563 455/427 |
| 2010/0117903 A1 * | 5/2010 | Zheng | ................... | H01Q 3/2605 342/373 |
| 2011/0032173 A1 * | 2/2011 | Chang | ..................... | H01Q 3/04 343/880 |
| 2011/0075601 A1 * | 3/2011 | Zheng | .................... | H04B 7/086 370/316 |
| 2011/0263199 A1 * | 10/2011 | Cruz | .................. | H04B 7/18506 455/12.1 |
| 2012/0120869 A1 * | 5/2012 | Miller | .................... | H04B 7/2041 370/316 |
| 2012/0300815 A1 * | 11/2012 | Tronc | ................. | H04B 7/18521 375/147 |
| 2014/0105100 A1 * | 4/2014 | Tronc | ................. | H04B 7/18513 370/321 |
| 2014/0113681 A1 * | 4/2014 | Reis | .................... | H04B 7/18508 455/552.1 |
| 2014/0128059 A1 * | 5/2014 | Tronc | ................. | H04B 7/18513 455/428 |
| 2014/0145877 A1 * | 5/2014 | Arcidiacono | ............ | G01S 5/02 342/357.42 |
| 2015/0381267 A1 * | 12/2015 | Tronc | ................. | H04B 7/18521 370/320 |
| 2016/0037434 A1 * | 2/2016 | Gopal | ................. | H04W 40/246 370/316 |
| 2016/0149599 A1 * | 5/2016 | Lindsay | ............... | H04B 1/0475 455/13.1 |
| 2016/0268676 A1 * | 9/2016 | Chang | ..................... | H01Q 3/04 |
| 2017/0006620 A1 * | 1/2017 | Reis | ..................... | H04L 43/16 |
| 2017/0063445 A1 * | 3/2017 | Feria | ................... | H04B 7/18513 |
| 2017/0085411 A1 * | 3/2017 | Noerpel | .................. | H04L 27/36 |
| 2017/0288769 A1 * | 10/2017 | Miller | .................... | H04B 7/212 |
| 2018/0013486 A1 * | 1/2018 | Irani | ................. | H04B 7/18521 |
| 2018/0234284 A1 * | 8/2018 | Noerpel | .................. | H04L 27/36 |

\* cited by examiner

FIGURE 1

| Symbol | Name | Description |
|---|---|---|
| P | LOCATION | LOCATION OF AN EARTH STATION, AT LATITUDE φ, WHICH MAY BE EITHER A GEO OR LEO EARTH STATION OR BOTH |
| A | ASCENDING LEO | LOCATION OF THE ASCENDING LEO SATELLITE |
| D | DESCENDING LEO | LOCATION OF THE DESCENDING LEO SATELLITE |
| C | CENTER OF EARTH | LOCATION OF THE CENTER OF THE EARTH FOR PURPOSES OF GEOMETRIC CALCULATION |
| $T_P$ | TANGENT AT P | THE TANGENT TO THE SURFACE OF THE EARTH AT LOCATION P |
| β | GEO PROTECTION ANGLE | ANGLE EITHER SIDE OF LINE FROM P TO GEO, SWEEPING OUT A REGION INSIDE OF WHICH LEO CANNOT COMMUNICATE WITH P |
| α | HORIZON ELEVATION ANGLE | MINIMUM ANGLE BETWEEN HORIZON AND LEO AT WHICH LEO AND P MAY COMMUNICATE, AS VIEWED FROM LOCATION P |
| γ | ANGLE TO GEO | ACUTE ANGLE BETWEEN HORIZON AND VECTOR POINTING TO GEO AT LOCATION P |
| λ | ANGLE OF TRAILING BEAM | THE ANGLE OF THE TRAILING BEAM WITH RESPECT TO THE LEO ORBIT RADIUS, VIEWED FROM THE LEO (IN QUADRANT 1) |
| ψ | ANGLE OF THE LEADING BEAM | THE ANGLE OF THE LEADING BEAM WITH RESPECT TO THE LEO ORBIT RADIUS, VIEWED FROM POINT P (IN QUADRANT 1) |
| φ | LATITUDE OF P | LATITUDE OF A PARTICULAR POINT P UNDER CONSIDERATION (EQUATOR AT 0 DEGREES, QUADRANT 1) |
| σ | LATITUDE OF LEO | LATITUDE OF A PARTICULAR LEO UNDER CONSIDERATION, IN ORBIT (EQUATOR AT 0 DEGREES, QUADRANT 1) |
| θ | LEO SPACING ANGLE | ANGLE BETWEEN TWO LEO SATELLITES IN A SINGLE PLANE, WHERE ANGLE VERTEX IS THE EARTH'S CENTER |
| a | DISTANCE TO LEO ASCEND | DISTANCE FROM POINT P TO THE <u>A</u>SCENDING LEO, LABELED POINT A, WHEN VIEWED FROM POINT P |
| d | DISTANCE TO LEO DESCEND | DISTANCE FROM POINT P TO THE <u>D</u>ESCENDING LEO, LABELED POINT D, WHEN VIEWED FROM POINT P |
| g | DISTANCE TO GEO SAT | DISTANCE FROM POINT P TO A GEOSTATIONARY SATELLITE AT THE SAME LONGITUDE AS P, OR OTHERWISE PROJECTED INTO THE PLANE OF THE LEO ORBIT |
| s | DISTANCE BETWEEN LEOs | THE LINE-OF-SIGHT DISTANCE BETWEEN LEO SATELLITES ORBITING AT HEIGHT h SPACED AT ANGLE θ |
| $r_E$ | RADIUS OF EARTH | 6371 KM |
| h | HEIGHT OF LEO ORBIT | ORBIT HEIGHT ABOVE EARTH OF THE LEO SATELLITE CONSTELLATION |
| $r_L$ | RADIUS OF LEO ORBIT | RADIUS OF LEO ORBIT (REFERENCED TO CENTER OF EARTH), NOMINALLY (6371 + h) KM |
| $r_G$ | RADIUS OF GEO ORBIT | RADIUS OF GEO ORBIT (REFERENCE TO CENTER OF EARTH), NOMINALLY 42,157 KM |

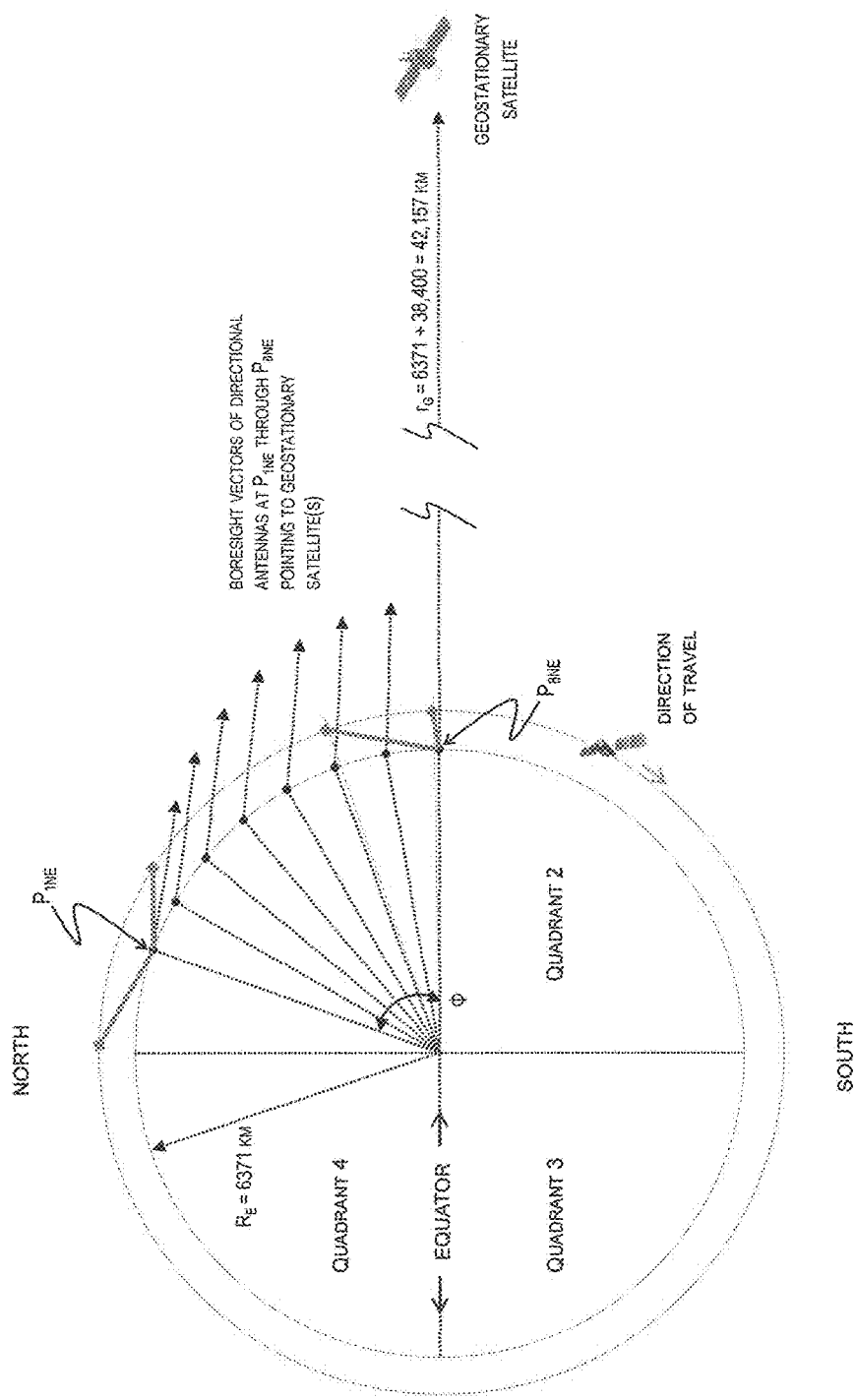

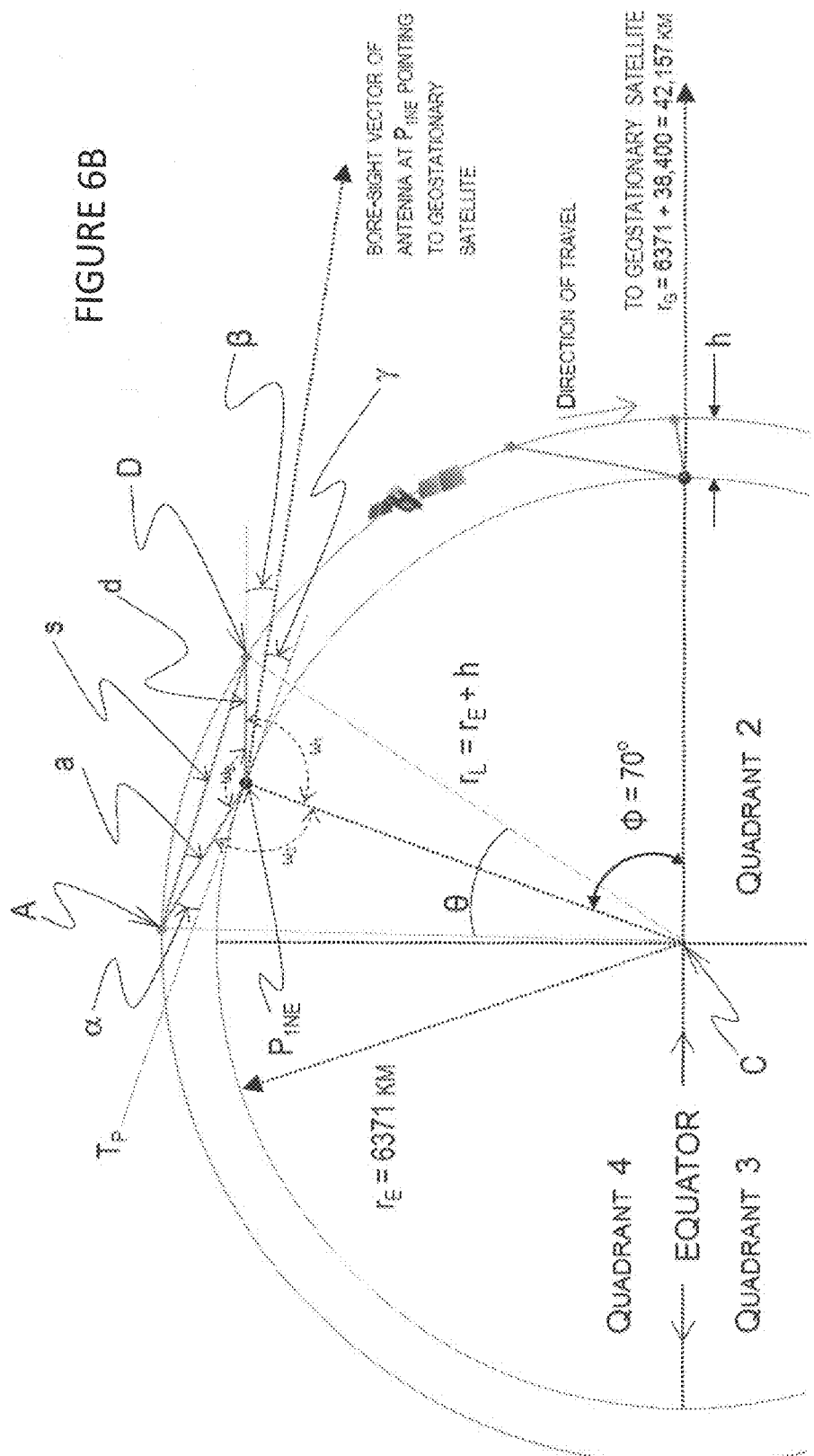

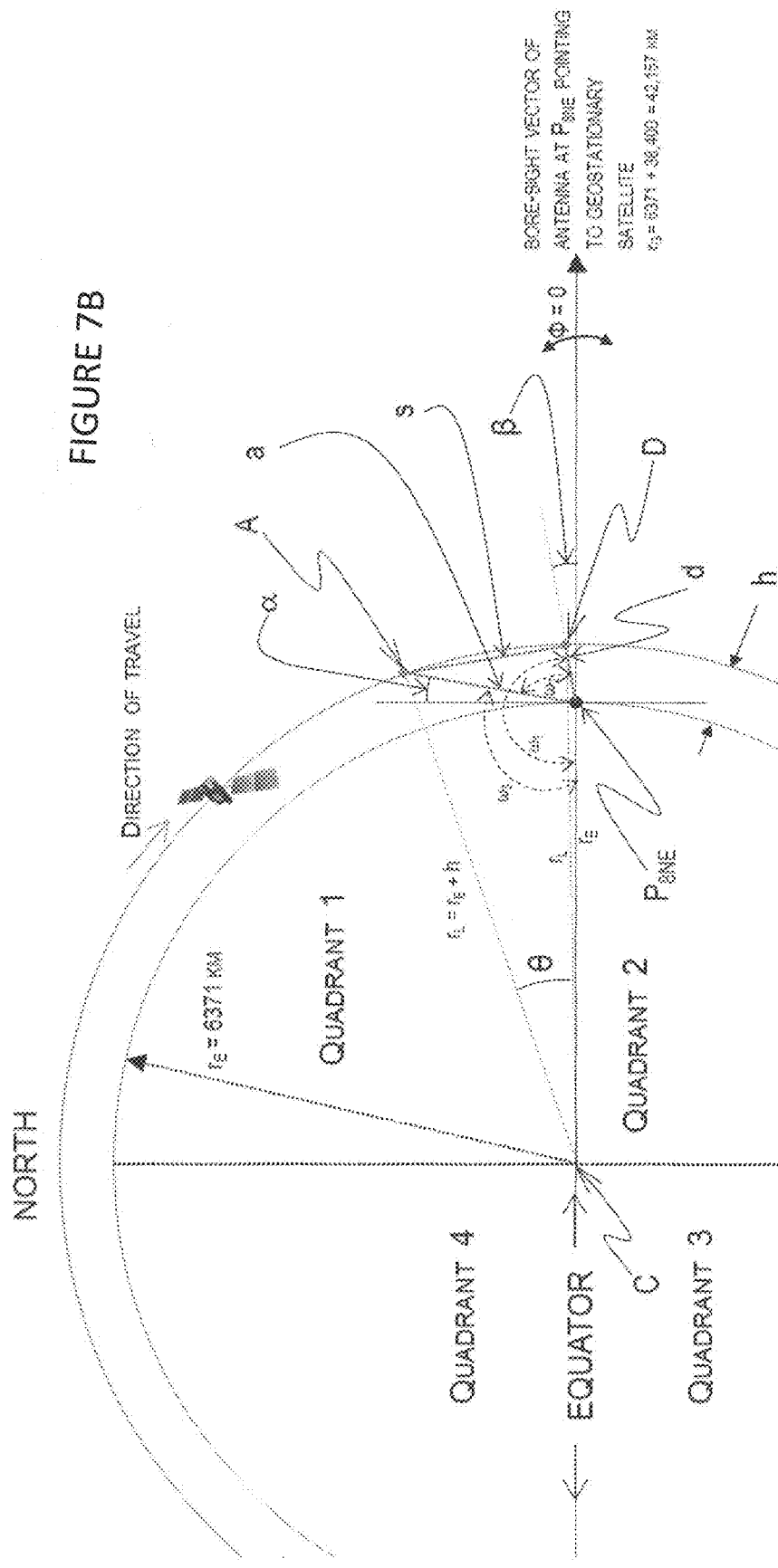

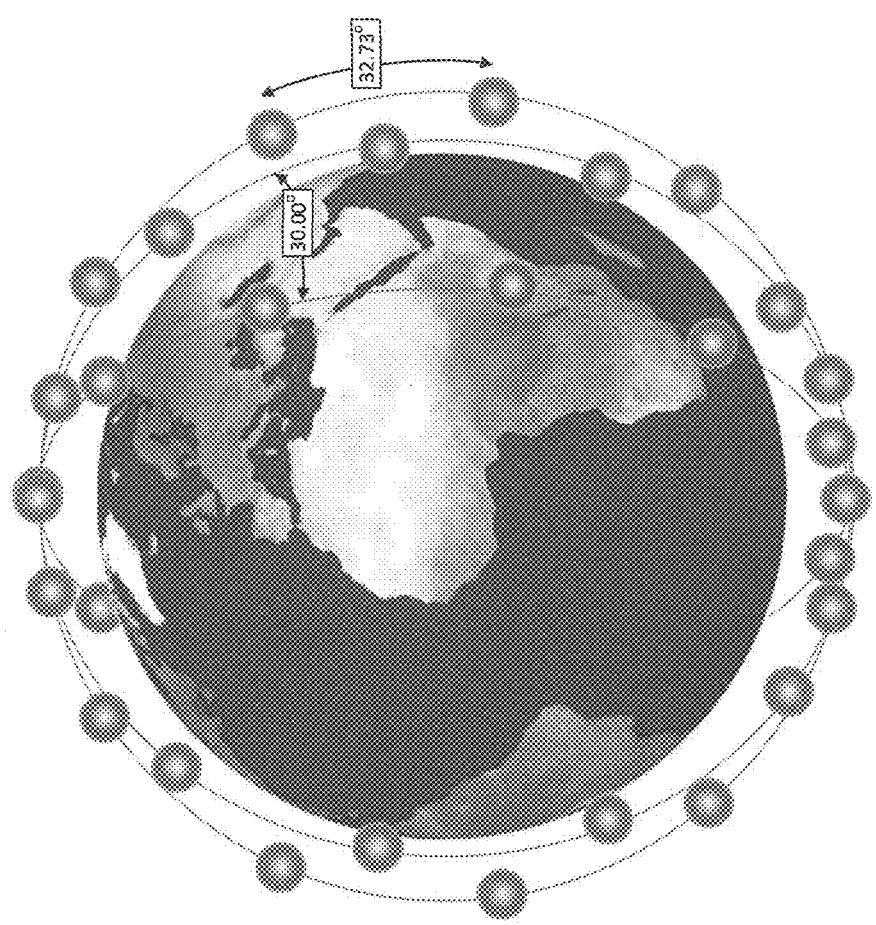

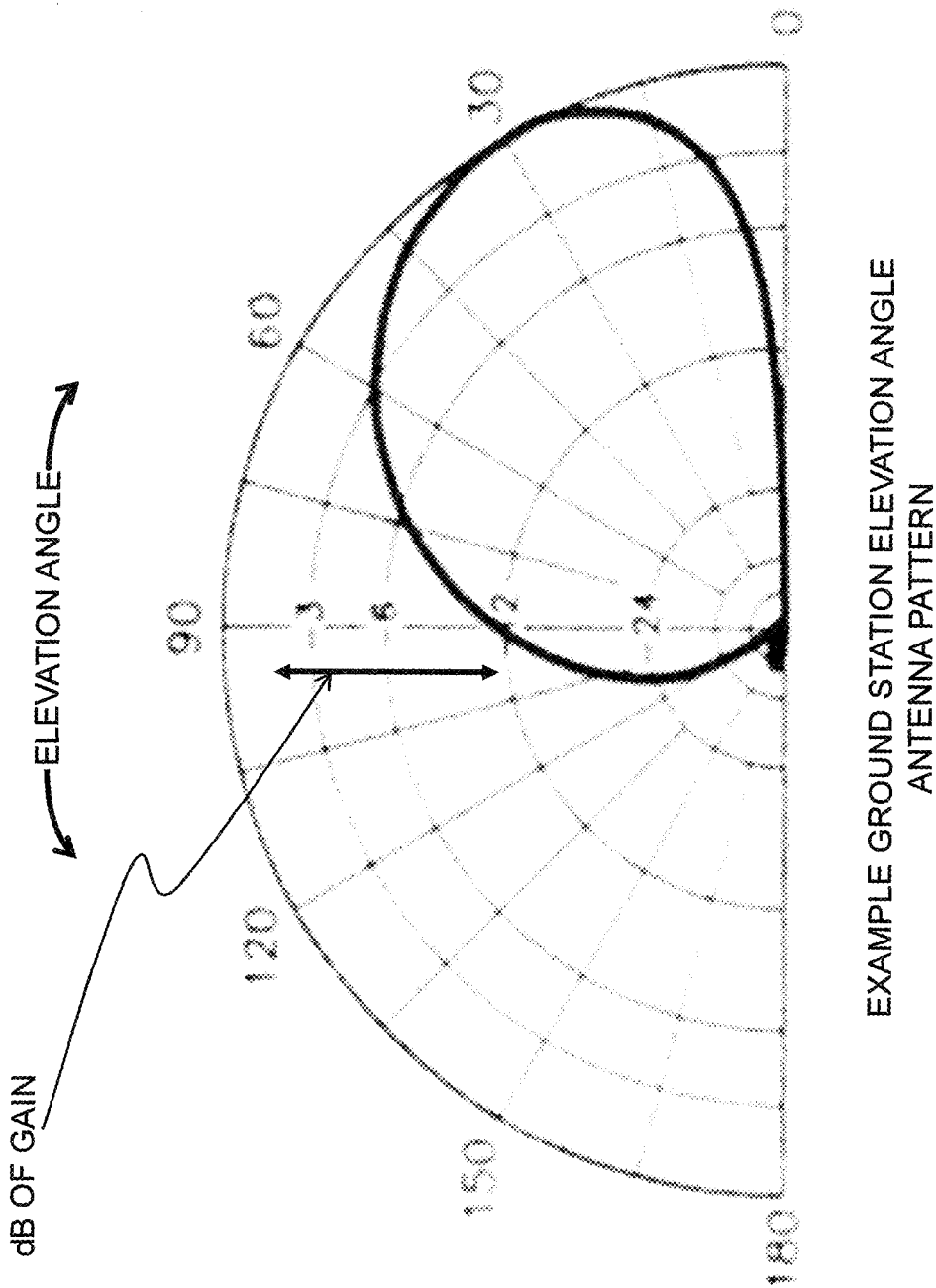

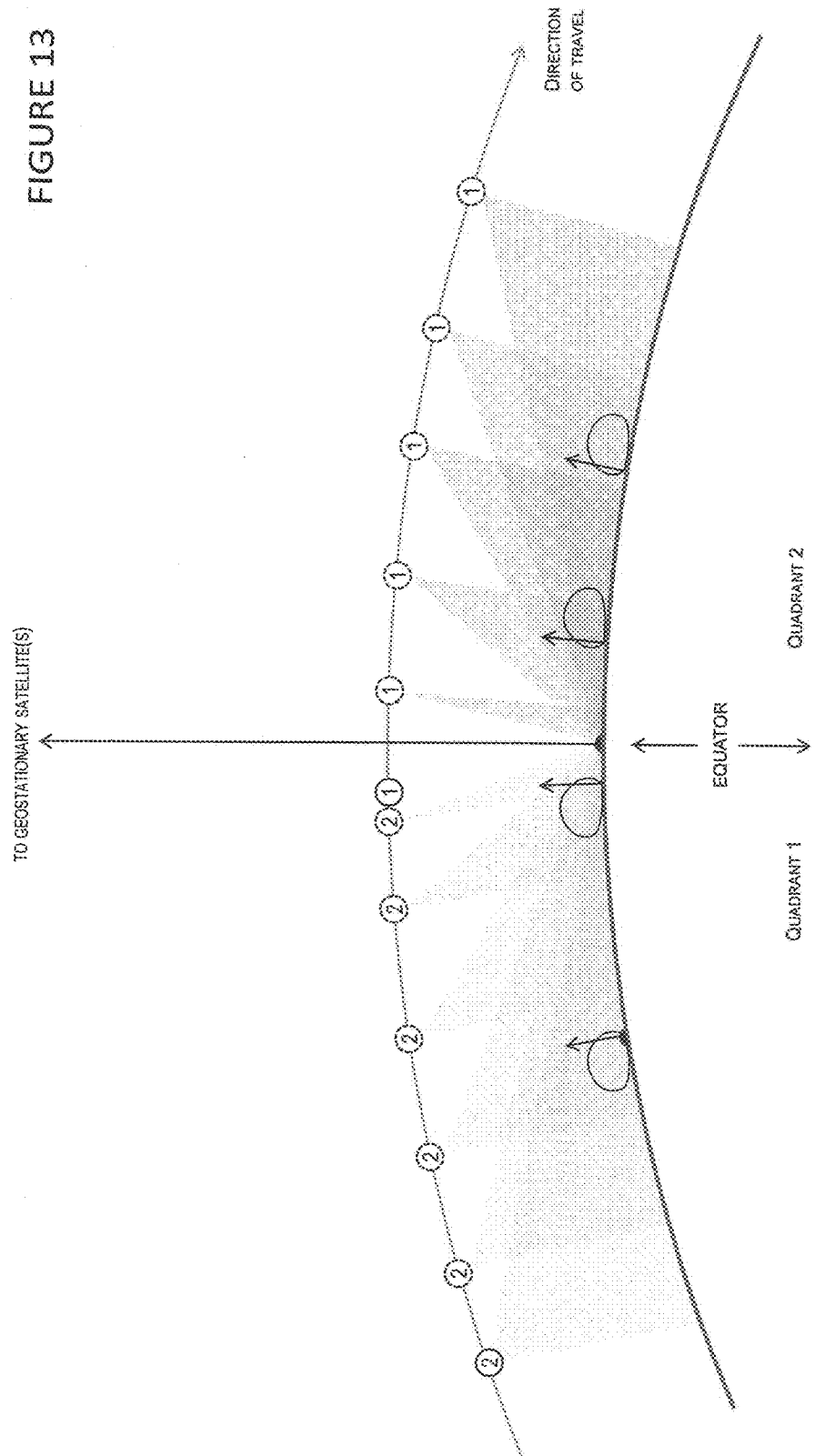

Inputs

| | | |
|---|---|---|
| α | 5 degrees | 0.087 radians |
| β | 5 degrees | 0.087 radians |
| h | 1,800 km | |
| $r_i$ | 8,171 km | |

Constants

| | | |
|---|---|---|
| π | 3.1415927 | |
| $r_e$ | 6,371 km | |
| $r_G$ | 42,157 km | |

Computations

| φ Latitude of Earth Station P (degrees) | $d_G$ Distance to GEO (km) | γ Angle to GEO (degrees) | a Segment P-A Length (km) | d Segment P-D Length (km) | s Segment A-D Length (km) | Θ Maximum Angular Sat Spacing (degrees) | N No. of Sats Req'd per plane (each) | σ LEO Sat Limit Latitude (degrees) | ψ Fwd Beam Angle at Limit (degrees) | λ Max. Back Beam Angle versus Lat. (degrees) | σ Sat Lat. at Indicated Back Angle (degrees) | σ Latitude of LEO Sat (degrees) | ψ Fwd Beam Angle to Equator (degrees) | d Dist. from LEO Sat to $P_{EQ}$ (km) |
|---|---|---|---|---|---|---|---|---|---|---|---|---|---|---|
| 80 | 41,527 | 1.31 | - | - | - | - | - | - | - | 50.80 | 47.11 | 80 | >50.96 | >4,591 |
| 70 | 40,424 | 11.48 | - | - | - | - | - | - | - | 48.39 | 44.87 | 70 | >50.96 | >4,591 |
| 60 | 39,360 | 21.94 | - | - | - | - | - | - | - | 44.03 | 40.98 | 60 | >50.96 | >4,591 |
| 50 | 38,373 | 32.69 | - | - | - | - | - | - | - | 38.10 | 35.79 | 50 | >50.96 | >4,591 |
| 40 | 37,501 | 43.73 | - | - | - | - | - | - | - | 30.95 | 29.68 | 40 | >50.96 | >4,591 |
| 30 | 36,778 | 55.03 | - | - | - | - | - | - | - | 22.92 | 22.95 | 30 | 50.21 | 4,146 |
| 20 | 36,236 | 66.55 | - | - | - | - | - | - | - | 14.28 | 15.84 | 20 | 44.93 | 3,085 |
| 10 | 35,900 | 78.23 | - | - | - | - | - | - | - | 5.27 | 8.50 | 10 | 30.25 | 2,196 |
| 9 | 35,878 | 79.41 | - | - | - | - | - | - | - | 4.36 | 7.77 | 9 | 27.95 | 2,126 |
| 8 | 35,859 | 80.58 | - | - | - | - | - | - | - | 3.44 | 7.03 | 8 | 25.46 | 2,062 |
| 7 | 35,842 | 81.76 | - | - | - | - | - | - | - | 2.53 | 6.29 | 7 | 22.80 | 2,004 |
| 6 | 35,827 | 82.93 | - | - | - | - | - | - | - | 1.61 | 5.54 | 6 | 19.95 | 1,952 |
| 5 | 35,815 | 84.11 | - | - | - | - | - | - | - | 0.69 | 4.80 | 5 | 16.93 | 1,907 |
| 4 | 35,804 | 85.29 | - | - | - | - | - | - | - | -0.23 | 4.06 | 4 | 13.75 | 1,869 |
| 3 | 35,796 | 86.47 | - | - | - | - | - | - | - | -1.14 | 3.32 | 3 | 10.44 | 1,839 |
| 2 | 35,791 | 87.64 | - | - | - | - | - | - | - | -2.06 | 2.58 | 2 | 7.03 | 1,818 |
| 1 | 35,787 | 88.82 | - | - | - | - | - | - | - | -2.98 | 1.84 | 1 | 3.53 | 1,804 |
| 0 | 35,786 | 90.00 | 4,591 | 1,805 | 4,632 | 32.93 | 11 | 34.04 | 50.96 | -3.90 | 1.10 | 0 | 0.00 | 1,800 |

TABLE 1

FIGURE 14

| | | | | | | | | | | | | | |
|---|---|---|---|---|---|---|---|---|---|---|---|---|---|
| α | | 5 | degrees | 0.087 radians | | | | π | 3.1415927 | | | | |
| β | | 0 | degrees | 0.000 radians | | | | $r_E$ | 6,371 km | | | | |
| h | | 1,800 | km | | | | | $r_G$ | 42,157 km | | | | |
| $r_L$ | | 8,171 | km | | | | | | | | | | |

| φ | $d_G$ | γ | a | d | s | θ | N | ε | ψ | λ | σ | σ | ψ | d |
|---|---|---|---|---|---|---|---|---|---|---|---|---|---|---|
| Latitude of Earth Station P (degrees) | Distance to GEO (km) | Angle to GEO (degrees) | Segment P-A Length (km) | Segment P-D Length (km) | Segment A-D Length (km) | Maximum Angular Sat Spacing (degrees) | No. of Sats Req'd per plane (each) | LEO Sat Limit Latitude (degrees) | Fwd Beam Angle at Limit (degrees) | Max Back Beam Angle versus Lat. (degrees) | Sat Lat. at Indicated Back Angle (degrees) | Latitude of LEO Sat (degrees) | Fwd Beam Angle to Equator (degrees) | Dist. from LEO Sat to $P_{EQ}$ (km) |
| 80 | 41,527 | 1.31 | - | - | - | - | - | - | - | 51.22 | 42.53 | 80 | >50.96 | >4,591 |
| 70 | 40,424 | 11.48 | - | - | - | - | - | - | - | 49.83 | 41.31 | 70 | >50.96 | >4,591 |
| 60 | 39,360 | 21.94 | - | - | - | - | - | - | - | 46.32 | 38.26 | 60 | >50.96 | >4,591 |
| 50 | 38,373 | 32.69 | - | - | - | - | - | - | - | 41.01 | 33.70 | 50 | >50.96 | >4,591 |
| 40 | 37,501 | 43.73 | - | - | - | - | - | - | - | 34.29 | 28.02 | 40 | >50.96 | >4,591 |
| 30 | 36,778 | 55.03 | - | - | - | - | - | - | - | 26.54 | 21.57 | 30 | 50.21 | 4,146 |
| 20 | 36,236 | 66.55 | - | - | - | - | - | - | - | 18.07 | 14.63 | 20 | 44.93 | 3,085 |
| 10 | 35,900 | 78.23 | - | - | - | - | - | - | - | 9.15 | 7.38 | 10 | 30.25 | 2,396 |
| 9 | 35,878 | 79.41 | - | - | - | - | - | - | - | 8.24 | 6.65 | 9 | 27.95 | 2,126 |
| 8 | 35,859 | 80.58 | - | - | - | - | - | - | - | 7.33 | 5.91 | 8 | 25.46 | 2,062 |
| 7 | 35,842 | 81.76 | - | - | - | - | - | - | - | 6.42 | 5.18 | 7 | 22.80 | 2,004 |
| 6 | 35,827 | 82.93 | - | - | - | - | - | - | - | 5.50 | 4.44 | 6 | 19.95 | 1,952 |
| 5 | 35,815 | 84.11 | - | - | - | - | - | - | - | 4.59 | 3.70 | 5 | 16.93 | 1,907 |
| 4 | 35,804 | 85.29 | - | - | - | - | - | - | - | 3.67 | 2.96 | 4 | 13.75 | 1,869 |
| 3 | 35,796 | 86.47 | - | - | - | - | - | - | - | 2.75 | 2.22 | 3 | 10.44 | 1,839 |
| 2 | 35,791 | 87.64 | - | - | - | - | - | - | - | 1.84 | 1.48 | 2 | 7.03 | 1,818 |
| 1 | 35,787 | 88.82 | - | - | - | - | - | - | - | 0.92 | 0.74 | 1 | 3.53 | 1,804 |
| 0 | 35,786 | 90.00 | 4,591 | 1,800 | 4,783 | 34.04 | 11 | 34.04 | 50.96 | 0.00 | 0.00 | 0 | 0.00 | 1,800 |

TABLE 2

FIGURE 15

TABLE 3

Inputs:
| | | |
|---|---|---|
| α | 10 | degrees |
| β | 10 | degrees |
| h | 800 | km |
| $r_L$ | 7,171 | km |

Constants:
| | | |
|---|---|---|
| π | 3.1415927 | |
| $r_E$ | 6,371 | km |
| $r_G$ | 42,157 | km |

Calculations:

| φ | $d_G$ | γ | a | d | s | θ | N | σ | ψ | λ | σ | σ | ψ | d |
|---|---|---|---|---|---|---|---|---|---|---|---|---|---|---|
| Latitude of Earth Station P (degrees) | Distance to GEO (km) | Angle to GEO (degrees) | Segment P-A Length (km) | Segment P-D Length (km) | Segment A-D Length (km) | Maximum Angular Sat Spacing (degrees) | No. of Sats Req'd per plane (each) | LEO Sat Limit Latitude (degrees) | Fwd Beam Angle at Limit (degrees) | Max Back Beam Angle versus Lat. (degrees) | Sat Lat. at Indicated Back Angle (degrees) | Latitude of LEO Sat (degrees) | Fwd Beam Angle to Equator (degrees) | Dist. from LEO Sat to $P_{eq}$ (km) |
| 80 | 41,527 | 1.31 | | | | | | | | 60.60 | 61.91 | 80 | >61.04 | >2,366 |
| 70 | 40,424 | 11.48 | | | | | | | | 55.75 | 57.25 | 70 | >61.04 | >2,366 |
| 60 | 39,360 | 21.94 | | | | | | | | 48.93 | 50.87 | 60 | >61.04 | >2,366 |
| 50 | 38,373 | 32.59 | | | | | | | | 40.77 | 43.46 | 50 | >61.04 | >2,366 |
| 40 | 37,501 | 43.73 | | | | | | | | 31.71 | 35.44 | 40 | >61.04 | >2,366 |
| 30 | 36,778 | 55.03 | | | | | | | | 22.03 | 27.06 | 30 | >61.04 | >2,366 |
| 20 | 36,236 | 66.55 | | | | | | | | 11.92 | 18.48 | 20 | >61.04 | >2,366 |
| 10 | 35,900 | 78.23 | | | | | | | | 1.57 | 9.80 | 10 | 50.97 | 1,424 |
| 9 | 35,878 | 79.41 | | | | | | | | 0.53 | 8.93 | 9 | 48.61 | 1,329 |
| 8 | 35,859 | 80.58 | | | | | | | | -0.52 | 8.07 | 8 | 45.81 | 1,237 |
| 7 | 35,842 | 81.76 | | | | | | | | -1.56 | 7.20 | 7 | 42.49 | 1,149 |
| 6 | 35,827 | 82.93 | | | | | | | | -2.61 | 6.33 | 6 | 38.58 | 1,068 |
| 5 | 35,815 | 84.11 | | | | | | | | -3.65 | 5.46 | 5 | 33.97 | 0.994 |
| 4 | 35,804 | 85.29 | | | | | | | | -4.70 | 4.59 | 4 | 28.59 | 0.929 |
| 3 | 35,796 | 86.47 | | | | | | | | -5.74 | 3.72 | 3 | 22.41 | 0.875 |
| 2 | 35,791 | 87.64 | | | | | | | | -6.79 | 2.86 | 2 | 15.46 | 0.834 |
| 1 | 35,787 | 88.82 | | | | | | | | -7.83 | 1.99 | 1 | 7.90 | 0.809 |
| 0 | 35,786 | 90.00 | 2,366 | 811 | 2,223 | 17.84 | 21 | 18.96 | 61.04 | -8.87 | 1.13 | 0 | 0.00 | 0.800 |

FIGURE 16

| Inputs | | | Constants | | |
|---|---|---|---|---|---|
| $f$ | 12 | GHz | $\pi$ | 3.1415927 | |
| $\alpha$ | 10 degrees | | $c$ | 299,792 km/s | |
| $\beta$ | 10 degrees | | | | |
| $h$ | 800 km | | | | |

| Path loss LEO Satellite to Earth Station compared to GEO | | | | | |
|---|---|---|---|---|---|
| $a$ | FSPL | NFSPL | | $d_G$ | GEOPL |
| Path LEO to Earth Station | Free Space Path Loss | Normalized FSPL | | Distance to GEO | GEO Path Loss |
| (km) | (dB) | (dB) | | (km) | (dB) |
| 2,366 | 182 | -9.06 | | 41,527 | 206 |
| 1,424 | 177 | -4.65 | | 40,424 | 206 |
| 1,329 | 176 | -4.04 | | 39,360 | 206 |
| 1,237 | 176 | -3.42 | | 38,373 | 206 |
| 1,149 | 175 | -2.79 | | 37,501 | 206 |
| 1,068 | 175 | -2.15 | | 36,778 | 205 |
| 994 | 174 | -1.52 | | 36,236 | 205 |
| 929 | 173 | -0.93 | | 35,900 | 205 |
| 875 | 173 | -0.41 | | 35,786 | 205 |
| 834 | 172 | 0.00 | | 35,786 | 205 |

TABLE 4

FIGURE 17

LOW EARTH ORBIT SATELLITE CONSTELLATION SYSTEM FOR COMMUNICATIONS WITH RE-USE OF GEOSTATIONARY SATELLITE SPECTRUM

CROSS-REFERENCE TO RELATED APPLICATIONS

This patent application claims the benefit under 35 U.S.C. 119 and 35 U.S.C. 120 of U.S. provisional application Ser. No. 62/331,245 entitled "Low Earth Orbit Satellite Constellation System for Communications with Re-Use of Geostationary Satellite Spectrum", filed May 3, 2016, the complete contents of which is herein incorporated by reference.

BACKGROUND OF THE INVENTION

1. Field of the Invention

The present invention relates to the field of satellite communications, and more particularly to systems, methods and devices for implementing a satellite communication system with low earth orbiting (LEO) satellites that provides re-use of geo-stationary earth orbiting (GEO) communication satellite re-use frequencies.

2. Brief Description of the Related Art

A large amount of microwave spectrum suitable for communications between earth stations and satellites is allocated by various national and international regulatory agencies to communications services involving geo-stationary earth orbit (GEO) satellites. In the present situation, there is very little unallocated microwave spectrum left for allocation to new communications services employing satellite based communications systems as they are traditionally conceived, constructed and operated. In addition, much of the existing spectrum allocated to GEO satellite communication services is already consumed with existing applications, primarily for television distribution, existing telephony backhaul and government data movement. As such, it is unlikely that existing GEO satellite communications system operators will be either able to repurpose any of their existing allocated spectrum to new applications as rapidly as such applications are growing.

New industries with requirements for high volumes and high rates of data are emerging rapidly, and many applications within these industries require high data volume or high data rate global communications capabilities, and communications coverage outside of the service areas of terrestrial based networks. Some examples include remote sensing, remote control of unmanned aerial vehicles, video and image-based communications (as contrasted to audio communications), video and image based machine-to-machine communications and control, and ultra-high security data transfers between two earth stations without transiting through a terrestrial network. These applications are well suited for service by purpose-built satellite communications systems. However deployment of new satellite based communications systems are largely constrained by lack of available spectrum for allocation.

Satellite communications systems today are well known and are responsible for many modern conveniences, including the distribution of direct broadcast television throughout many parts of the world. While there are presently a few low-earth-orbit (LEO) and middle-earth-orbit (MEO) satellites and satellite constellations dedicated to communications functions, most of the communications satellites and systems today are of the geo-stationary earth orbit (GEO) type.

The International Telecommunications Union (ITU) as well as other governing and regulatory bodies have recognized and allocated large swaths of the radio frequency spectrum to GEO satellite usage for bi-directional communications between the earth and the satellite for a wide variety of purposes. The large number of GEO satellites in operation today has led to a situation in which there is very little spectrum available for new satellite communications links Most mobile earth station-to-satellite communications can only be practically met by employing microwave frequencies, so that the antennas employed on the earth stations can be small and/or portable, and so that the data rates that can be transceived with known data communications methods can be high. This imposes a practical lower limit to the usable earth station-to-satellite communications frequencies, irrespective of regulatory or assignment issues. Because of atmospheric absorption and rain-fade issues, there is a practical upper limit to the usable earth station-to-satellite communications frequencies as well, irrespective of regulatory or assignment issues. Between these practical limits, there is little unused spectrum available for new assignments, as most of it is already allocated to earth-space communications with GEO satellite systems, for fixed satellite services.

Much of the spectrum in the so-called Ka and Ku bands is assigned to fixed satellite service uses, employing a GEO satellite for the space segment, which, because of the fact that GEO satellites appear to an earth station at a fixed point in the sky, are necessarily directional, instead of omnidirectional. For example, the most popular use of GEO associated spectrum presently is for direct broadcast of television programs, which are received by small directional dishes at earth stations, with fixed pointing, typically mounted on customer's homes or buildings. The 3 dB beam width of popular consumer grade direct broadcast satellite antennas is on the order of 2 to 3 degrees, and they are highly directional.

SUMMARY OF THE INVENTION

This invention discloses a system for re-using GEO-allocated communications spectrum in a LEO satellite constellation based communications system, such that the LEO satellite originated signals will not appear in the beam-width of GEO-pointed earth station antennas, but nevertheless the LEO satellite constellation can have 100% coverage of an earth station located anywhere on the surface of the earth, at all times, without any coordination in any way with the GEO satellites or GEO-pointing ground stations. In addition, this invention discloses the details of the earth stations associated with the disclosed LEO satellite communications constellation which enhance the isolation between the GEO communications system and the LEO communications system using the same spectrum, by taking measures to prevent a GEO satellite from inadvertently picking us earth stations which are intending to communicate with the disclosed LEO satellite constellation.

Embodiments of the invention provide a method for constructing and operating a satellite communications system in low earth orbit (LEO) which may re-use any existing spectrum allocated to GEO-based satellite communications services without causing interference to the GEO-based communications system. Among other parameters which the algorithm accepts as free variables, the present invention accepts a parameter within any practical range for creating an angular guard band around any and all earth stations which are in a GEO-based communications system. The invention permits LEO-based communications simultaneously with an earth station (for LEO-based communications) located immediately next to a GEO-based earth station, at the same time, and over the same spectrum, without any need for the LEO-based system to coordinate in any way whatsoever with any GEO-based satellite or any GEO-based ground station. The system, method and devices are configured to simultaneously provide for 100% global coverage, as disclosed by the exemplary embodiments of the LEO-satellite constellation shown and described herein, to any earth station located anywhere, with no gaps or loss of contact at any time with any earth station.

The system, devices and method provide an arrangement of low earth orbiting satellites that are configured to provide communications between communicating devices and prevent the radiated power from a LEO satellite from appearing in the beam width of an earth station antenna (i.e., of the GEO satellite associated earth station) pointed at a specific GEO satellite. The system, devices and method preferably implement LEO satellite based communications, whilst nevertheless communicating with an earth station associated with the LEO satellite communication services that is positioned immediately next to the earth station antenna (e.g., of a GEO satellite associated earth station) pointed at a specific GEO satellite.

According to preferred embodiments, the invention may be implemented with satellites, and preferably with LEO satellites, that are configured to manage communications by directing their respective communications beams away from interference with separately operating GEO satellites over GEO-pointed ground stations and/or turning off transmission when the satellite beam (of the LEO satellite) would otherwise coincide with the beam of a GEO station antenna (e.g., a GEO earth station antenna boresight). Embodiments provide satellites configured with control mechanisms that direct the satellite antenna (or antennas) to control the beam coverage to provide communications with ground based devices, such as, an earth station, and/or or telecommunications network that may be linked with one or more earth stations. The satellites are configured to handle communications, such as for example, communications between two earth stations, or between an earth station and a ground-based network. The satellites may be configured with antennas that direct communications to provide a controllable coverage beam or beams, which includes a trailing or reward portion and a forward portion (relative to the orbit direction). The beam angle from a satellite antenna preferably is adjusted as the satellite moves through its orbit. According to some embodiments, the satellite antenna is controlled to adjust the beam to maximize the coverage without interfering with the GEO earth station antennas.

According to some embodiments, the system may be implemented with a LEO satellite constellation comprised of a plurality of LEO satellites configured with one or more controllable antennas that are used to manage the beam direction so as to avoid cross-over or interference with GEO antennas, and, in particular, the GEO antenna boresight. The satellites of the LEO constellation preferably hand-off communications to each other (e.g., such from one adjacent orbiting satellite to another adjacent orbiting satellite), such that, for example, when an LEO satellite beam of one satellite is turned off (so as to avoid a GEO antenna, and potential interference therewith), another of the LEO satellites picks up the communication. According to some embodiments, an adjacent satellite may comprise an adjacent satellite in the same orbital plane as the handing-off satellite, while according to some other embodiments, the satellite receiving a handoff of the communications may be a satellite that is adjacent to the handing-off satellite but in another orbital plane (e.g., where the satellite is in a different orbital plane with other satellites).

The present invention provides benefits and advantages, a summary of which, without limitation to other benefits not listed, may include one or more of the following. The LEO satellite constellation may be configured to re-use any GEO-communications spectrum, without causing interference to the GEO's fixed or mobile services, under normal conditions. The LEO constellation may be designed to accept, as an independent variable, any practical parameter for a guard-band angle around the GEO-pointing vector of earth stations (GEO earth stations) with directional antennas pointing toward a GEO satellite. The direction of the beam being transmitted toward any earth station by the LEO satellite preferably will always be in a direction opposing the direction which a GEO satellite would be transmitting to the same earth station, with respect to nadir at the earth station. According to some embodiments, the system may be implemented where a simple directional antenna affixed to the earth station associated with the LEO system, which only has to maintain pointing towards either North or South poles (depending on the quadrant of the earth station), may provide additional isolation margin for the LEO communications link compared to a GEO communications link, both operating to earth stations placed at the same location and operating at the same time. Furthermore, the system may provide LEO communications that are implemented with the same frequencies as the GEO broadcast frequencies, but are controlled to prevent or minimize interference. The present system and satellites operating in conjunction with the system may spatially re-use GEO satellite broadcast frequencies for communications services by LEO satellites.

The features described in connection with the system, the method, or satellites employed to implement the method, or embodiments thereof, may be provided together or in combinations, with one or more features being combined with one or more other features.

BRIEF DESCRIPTION OF THE DRAWING FIGURES

FIG. 1 presents the nomenclature used throughout this disclosure.

FIG. 5 is a diagram representing the earth and showing two sets of geometries overlaid, and indicating direction vectors to LEO satellite locations as an LEO satellite constellation orbits.

FIG. 6B is an enlarged partial view of the diagram of FIG. 6A, showing the top portion thereof.

FIG. 7B is an enlarged partial view of the diagram of FIG. 7A, showing the top portion thereof.

FIG. 11 is an illustration representing the earth and showing a satellite constellation (not to scale) according to the invention, which complies with the specifications of Table 1 (FIG. 14).

FIG. 12 is a diagram depicting an in-plane antenna pattern of a simple loop antenna.

FIG. 13 is an illustration representing the earth and showing an exemplary arrangement of satellites which comprise part of a constellation of satellites according to the invention, and showing antennas provided on the surface of the earth with maximum gain indications depicts.

FIG. 14 is a table, referenced as Table 1, showing tabulations of the various parameters for the input parameters of α=5 degrees, β=5 degrees and h=1,800 km.

FIG. 15 is a table, referenced as Table 2, which is similar to Table 1, but for the limiting case where β=0, the back angle never goes negative and the back beam angle λ at the equator is 0.

FIG. 16 is a table, referenced as Table 3, which is similar to Table 1, but for input parameters of α=10 degrees, β=10 degrees and h=800 km.

FIG. 17 is a table, referenced as Table 4, showing free space path loss (FSPL) in-plane calculated for various angles from a LEO satellite in a constellation orbiting at an altitude to an earth station, compared to the FSPL to a GEO satellite, at the same communications frequency.

DETAILED DESCRIPTION OF THE INVENTION

Referring to FIG. 1, nomenclature used throughout this disclosure and the Figures and Equations is presented. In addition, in order to effectively illustrate and explain the invention, the diagrams and equations presented are for a 2 dimensional view of the system, with diagrams being illustrated in FIGS. 2 through 13, and with equations (1 through 19) being presented herein and in a listing at the end of this section. One feature of the invention is that the LEO communications satellites in the constellation be in polar orbits. Because the plane containing geosynchronous satellites for which the frequencies are to be re-used are in an orbit which is orthogonal to any plane of the polar orbiting LEO communications satellite constellation disclosed, the 2D configuration disclosed in the diagrams and equations is the simple projection from any LEO orbital plane of a 3D configuration. Therefore, 3D diagrams and equations are projected extensions of the 2D depictions which are well understood and simple to produce by those practiced in the art of orbital mechanics and analysis.

Furthermore, more complex equations than those presented herein, which accommodate the slight ellipsoid shape of the earth and other higher order factors, are well known to those practiced in the art of orbital mechanics. The assumption of the earth as being perfectly spherical is used throughout this disclosure to illustrate the principles involved and the mechanics of the invention, but is not meant to form a limitation on any matter disclosed herein. The principles disclosed herein and the invention may be extended to accommodate a non-spherical earth and higher order orbital elements without departure from the scope of the disclosure.

Figure 2:
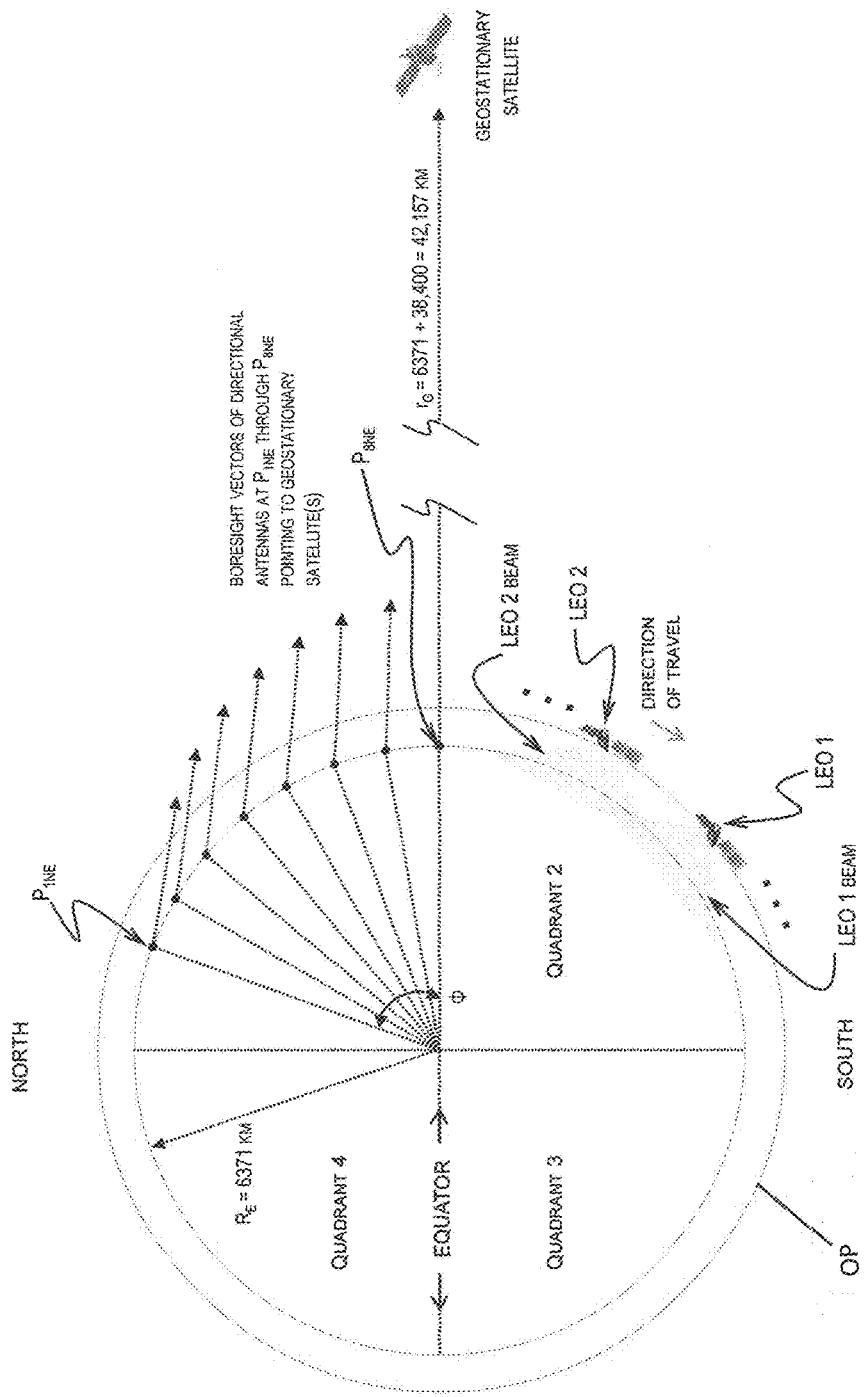
FIG. 2 is a diagram of the earth illustrating satellites and an orbit throughout the four quadrants.

FIG. 2 illustrates the situation and provides foundation for the subsequent Figures. In FIG. 2, a single plane of multiple LEO satellite planes of a LEO satellite constellation in a polar orbit is represented, with two of many satellites which would be in the orbital plane OP shown, indicated at LEO1 and LEO2. As would be typical for a LEO communications constellation, and as indicated in the figure as LEO1 BEAM and LEO2 BEAM, LEO satellites typically create overlapping beams of coverage, for both transmission to, and reception of, signals from ground stations. Within each beam of coverage of a single LEO satellite, there may be multiple sub-beams, enabling frequency and polarization re-use within a beam, in the communications functions with the earth stations. Furthermore, as is well understood by those practiced in the art, the beams and/or sub-beams may be directed in real-time in order to accommodate various orbital elements and earth station practicalities. By fully populating an orbital plane, and by positioning multiple orbital planes at regular angular longitudinal spacing, the entire earth can be covered at all times with beams of at least one satellite in the LEO communications constellation. The Iridium communications satellite constellation is an example of such a constellation, owned and operated by Iridium Satellite LLC. However, the Iridium system, as well as other systems, employ spectrum which is not the same as that employed by GEO satellite communications systems, and no more of such spectrum is available. Examples of satellites and their operations are disclosed in U.S. Pat. Nos. 5,410,728 and 5,604,920, the complete contents of which are herein incorporated by reference.

Still referring to FIG. 2, points on the surface of the earth in the northern hemisphere are indicated as P1NE at 70 degrees north latitude, through P8NE, which lies on the equator. For each point P, a vector is drawn indicating the bore sight of a directional antenna which would point at a geostationary satellite if located at that point. In addition, the LEO satellite orbit track OP shown orbits in a clockwise fashion, however this is simply for convention in the Figures and nomenclature in this disclosure and does not limit the generality of this disclosure. Under the convention used herein, for any point P in Quadrant 1 or 2, the LEO satellites in polar orbit ascend from the North and descend toward the South (in the direction of travel indicated).

Still referring to FIG. 2, as can be seen, anytime a LEO satellite using the same frequencies as a GEO satellite for communications with an earth station passes over a point P, there is a spot in the orbit track where the LEO satellite is directly in line between the GEO satellite and the earth station. Therefore, at that point, if the LEO satellite were transmitting on the same frequency that the earth station is set to receive from the GEO satellite, then interference would result, and the GEO satellite's signal could be interfered with by the LEO satellite's signal, as both signals on the same frequency would be simultaneously received by the earth station's antenna and RF front end, even with a highly directional earth station antenna pointed specifically at the GEO satellite.

Figure 3:
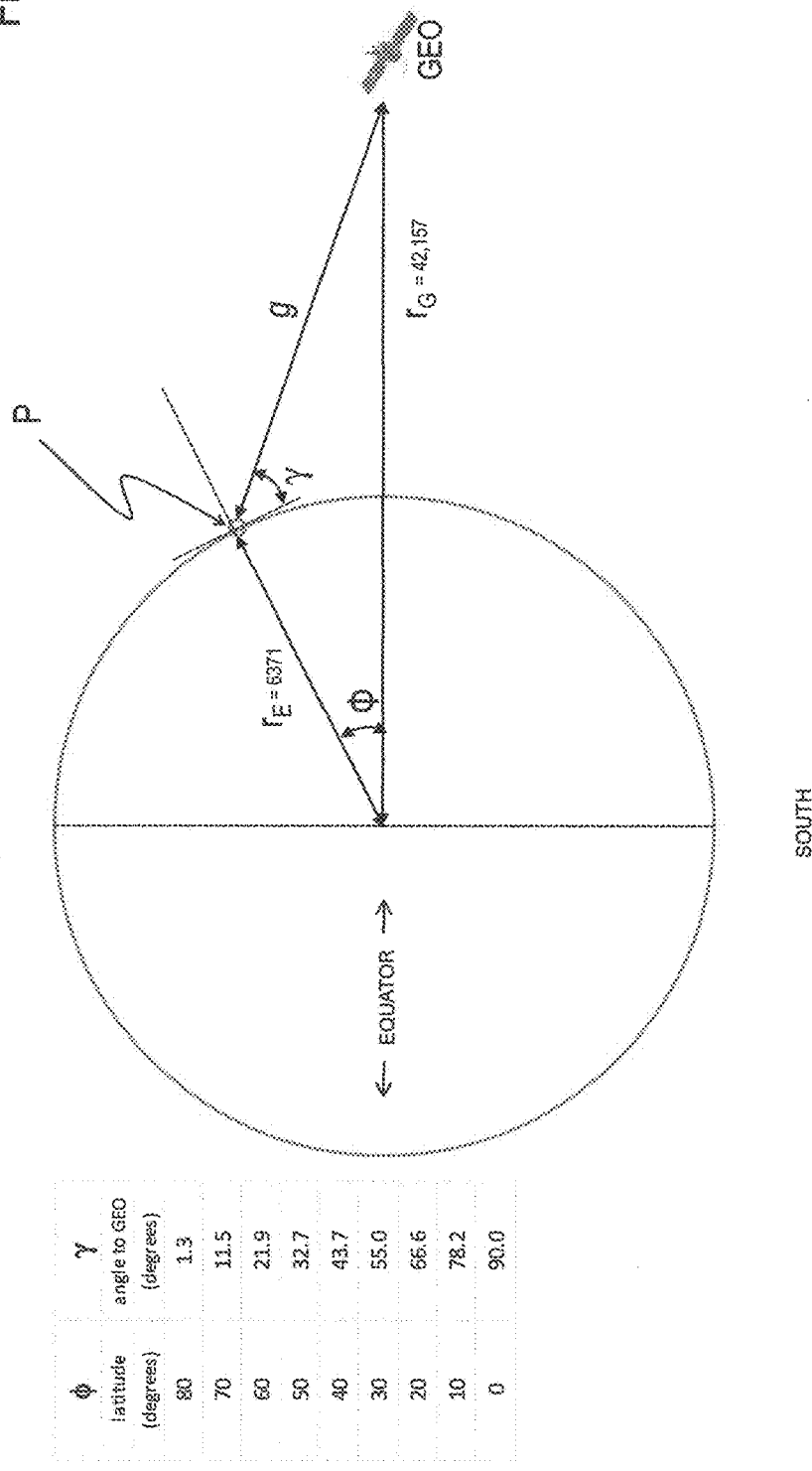
FIG. 3 is a diagram representing the earth and showing an actual elevation pointing angle between a directional antenna and a geostationary satellite.

Referring now to FIG. 3, the actual elevation pointing angle between a directional antenna at any point P on the surface of the earth, pointing to any geostationary satellite, is indicated. The azimuth pointing angle is not shown and not relevant to illustrating the operative principles since any azimuth angle in 3D would have the same projection into the orthogonal polar plane shown in FIG. 3. The governing Equations 1 and 2 provide the solutions to computation of $\gamma$ for any latitude $\Phi$. Equations 1 and 2 are set forth in the Equations Table and below (the equation number appearing next to the equation, in parentheses):

$$g = r_G[1+(r_E/r_G)^2 - 2(r_E/r_G)\cos(\phi)]^{1/2} \quad (1)$$

$$\gamma = \cos^{-1}[(r_G/g)\text{SIN}(\phi)] \quad (2)$$

By way of example, and without limitation, the table in FIG. 3 computes the approximate elevation angle for a directional antenna at increments of 10 degrees of latitude, starting 80 degrees of latitude, which is approximately the highest latitude under which GEO-to-earth station line-of-sight communication links could be sustained, to 0 degrees of latitude, which is the equator.

Figure 4:
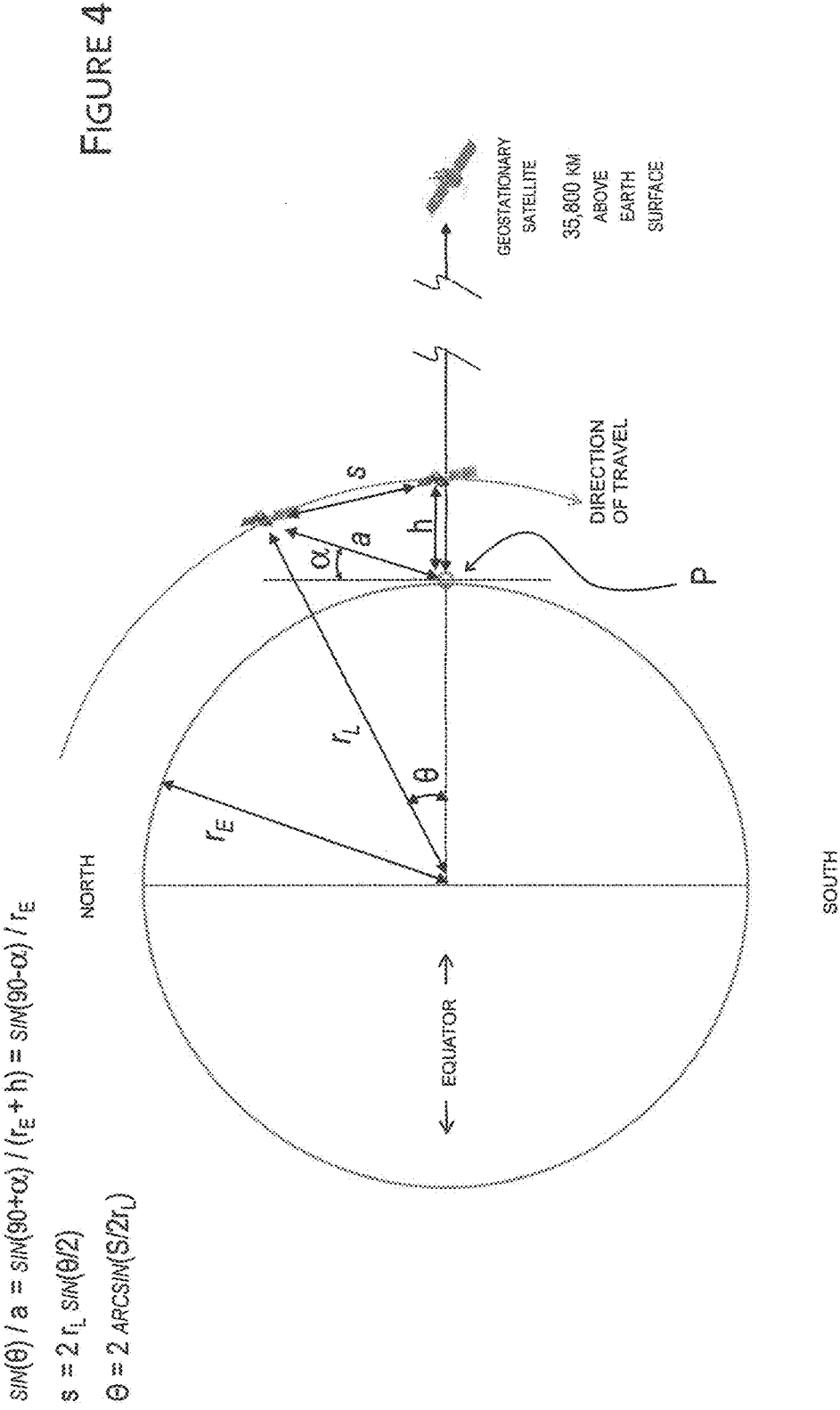
FIG. 4 is a diagram representing the earth and showing the geometry of two satellites in a LEO orbital plane.

Next, referring to FIG. 4, the geometry of two satellites in a LEO orbital plane is presented. In this FIG. 4 and including Equations 3 and 4, the relationship between the spacing, s, of the LEO satellites in-plane and the subtended angle $\theta$ as measured from a vertex at the earth's geometric center, C, is indicated. In this FIG. 4, P is indicated at the equator. Equations 3 and 4 are set forth below (the equation number appearing next to the equation, in parentheses).

$$\text{SIN}(\theta)/a = \text{SIN}(90+\alpha)/(r_E+h) = \text{SIN}(90-\alpha)/r_E \quad (3)$$

$$s = 2r_L \text{SIN}(\theta/2) \quad (4)$$

Expressed in terms of $\Theta$, Equation 5 provides a solution for determining the angle $\Theta$.

$$\theta = 2 \text{ ARCSIN}(S/2r_L) \quad (5)$$

Next, referring to FIG. 5, the two sets of geometries are overlaid, with the heavy blue lines indicating direction vectors to LEO satellite locations as the LEO satellite constellation orbits, as seen from P1NE and P8NE. In the FIG. 5 overlay it can be seen that as a LEO satellite approaches any point P on the earth from the north, a directional antenna at P pointing toward the GEO satellite is pointing south.

However, as any specific LEO satellite passes over and then goes beyond any point P, if it continues transmitting backwards toward the earth station at P, at some point it would transmit down the boresight of any antenna pointing toward a GEO satellite.

Figure 6A:
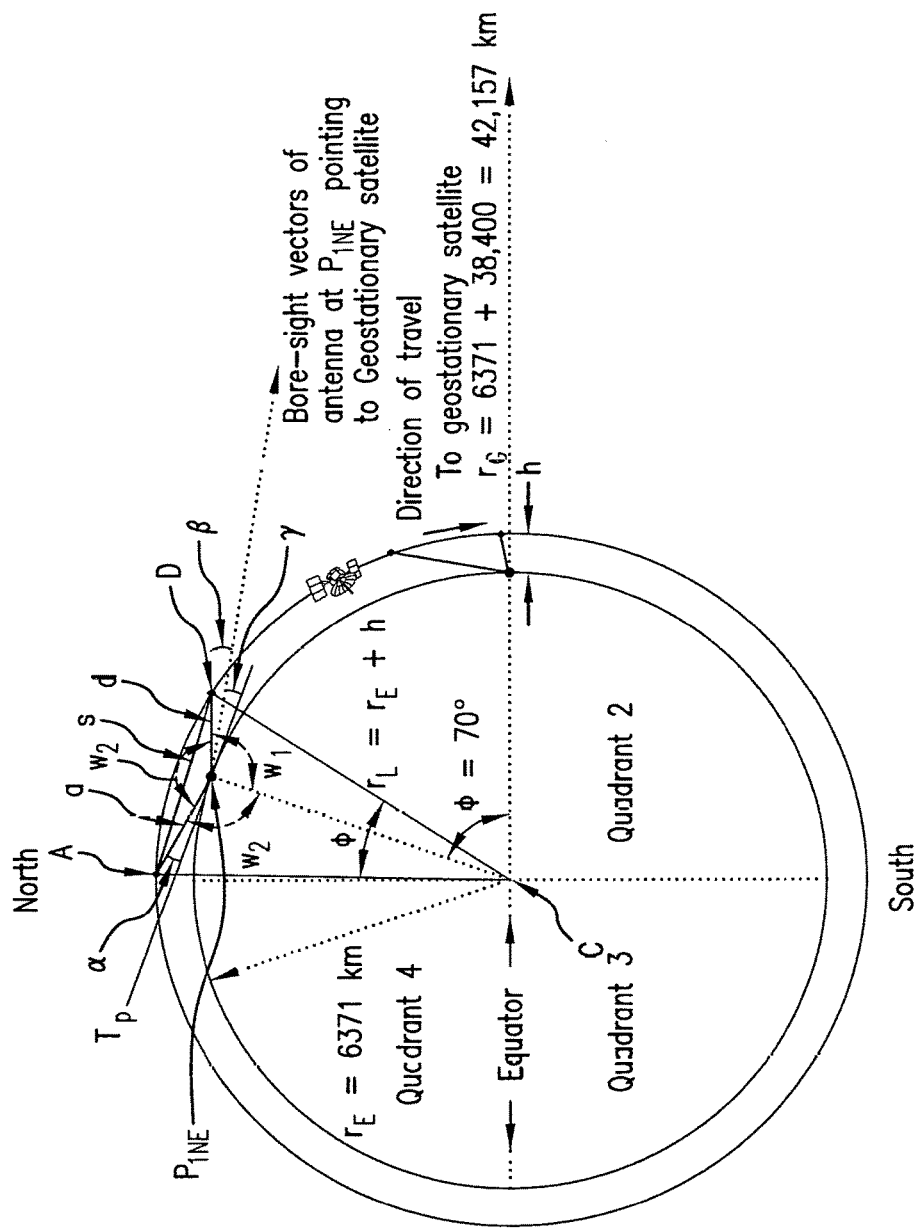
FIG. 6A is a diagram representing the earth and showing an end-case situation near maximum latitude where any earth station may be practically anticipated to communicate with a GEO satellite.
Figure 7A:
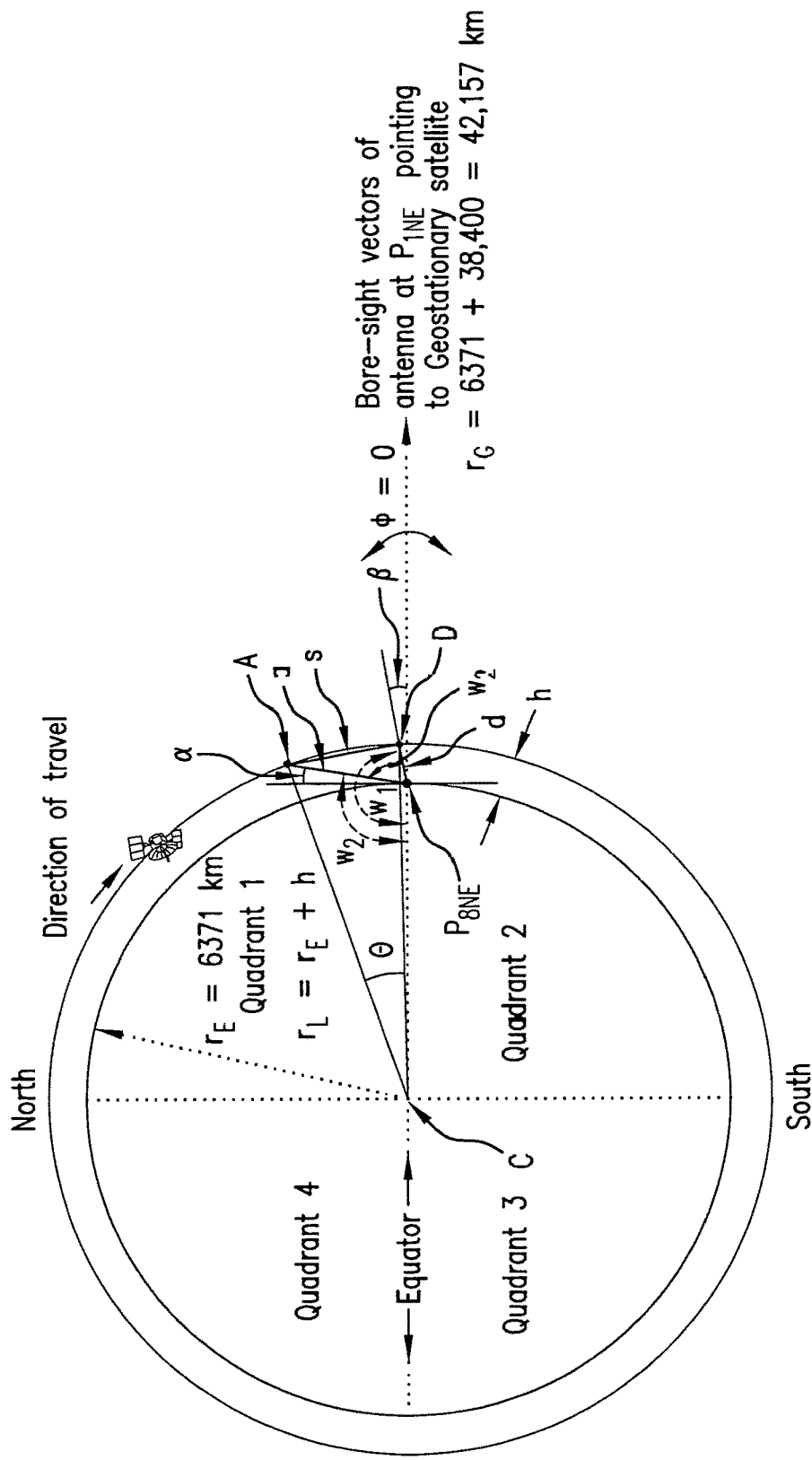
FIG. 7A is a diagram representing the earth and showing an end-case situation at the equator where any earth station may be practically anticipated to communicate with a GEO satellite.

In order for a LEO satellite constellation to provide continuous coverage to anywhere on earth, at least one satellite must be in view at all times from any point P on the earth, and the pointing direction from that satellite to the point P must not be the along the same vector as the pointing direction between point P and a GEO satellite. Therefore, during the period when a first satellite in LEO orbit must cease transmitting to point P in order to avoid interfering with GEO signals arriving at the same time and place on the same frequency, another second satellite in LEO orbit must be available in view of the point P in order to carry on whatever communications may be taking place between the LEO communications satellite constellation and the earth station at point P. FIGS. 6 and 7, including the 'zoom-in' views of those diagrams, will be used to demonstrate two end-case situations, first in FIGS. 6A, 6B at the near maximum latitude where any earth station may be practically anticipated to communicate with a GEO satellite (approximately 70 degrees latitude) and secondly in FIGS. 7A, 7B at the equator.

Referring now to FIGS. 6A, 6B, the computation is shown to compute the maximum spacing of two satellites in a polar LEO orbit which are, or could be, in communication with point P1NE at 70 degrees latitude, such that both (a) the earth station is never without line-of-sight to an orbiting LEO satellite suitably far enough above the local horizon to be available for reliable communications, and (b) during the period when any orbiting LEO satellite is within a guard band around the vector between the earth station and a GEO satellite, another LEO satellite is within view (and far enough above the local horizon), to take over any communications function with the earth station from the first LEO satellite (since the first LEO cannot transmit to the earth station when it is within the guard band, so that it does not interfere with the GEO satellite communications to the earth station).

In FIGS. 6A, 6B, s must be found (see Equations 3 and 4), which is used to compute $\theta$ (see Equation 5) and thus the number of satellites in the LEO orbital plane required, subject to the constraints that the satellite orbiting at altitude h must be at least an angle $\alpha$ above the local horizon and maintain a guard band angle of $\beta$ around the vector between the earth station and a GEO at angle $\gamma$. The cosine formula is employed, first with respect to triangle C-P1NE-D to compute d, then with respect to triangle C-P1NE-A to compute a, then finally with respect to triangle A-P1NE-D to compute s, given the previously computed d, previously computed a and known angle $\omega 1$. (Although Equation 8 may provide two solutions, the meaningful solution is utilized for the distance d.) The relevant equations are indicated as Equations 5 through 8, 9 through 12, and 11 through 13, which are set forth below (the equation number appearing next to the equation, in parentheses).

$$\Theta = 2_{ARCSIN}(S/2r_L) \quad (5)$$

$$r_L^2 = d^2 + r_E^2 - 2r_E d \cos\omega_1 \quad (6)$$

$$d^2 - 2r_E d \cos\omega_1 + (r_E^2 - r_L^2) = 0 \quad (7)$$

$$d = \frac{2r_E\cos\omega_1 \pm \sqrt{[2r_E\cos\omega_1]^2 - 4(r_E^2 - r_L^2)}}{2} \quad (8)$$

$$\omega_3 = (90 + \alpha) \quad (9)$$

$$r_L^2 = a^2 + r_E^2 - 2r_E a \cos\omega_3 \quad (10)$$

$$a^2 - 2r_E a \cos\omega_3 + (r_E^2 - r_L^2) = 0 \quad (11)$$

$$a = \frac{2r_E\cos\omega_3 \pm \sqrt{[2r_E\cos\omega_3]^2 - 4(r_E^2 - r_L^2)}}{2} \quad (12)$$

$$\omega_2 = (180 - \alpha - \gamma - \beta) \quad (13)$$

As can be seen by comparing FIGS. 6A, 6B and FIGS. 7A, 7B, as a satellite in the LEO constellation approaches the equator and covers a point P with its communications beam, the distance between when the satellite ascends above the horizon and when it must stop transmitting to the point P, as P also approaches the equator, is reduced. Unlike the more northerly positions of the satellite and points P, however, point P at the equator can also be communicated with by a LEO satellite which is departing the equator, or descending in the sky to the South.

Figure 8:
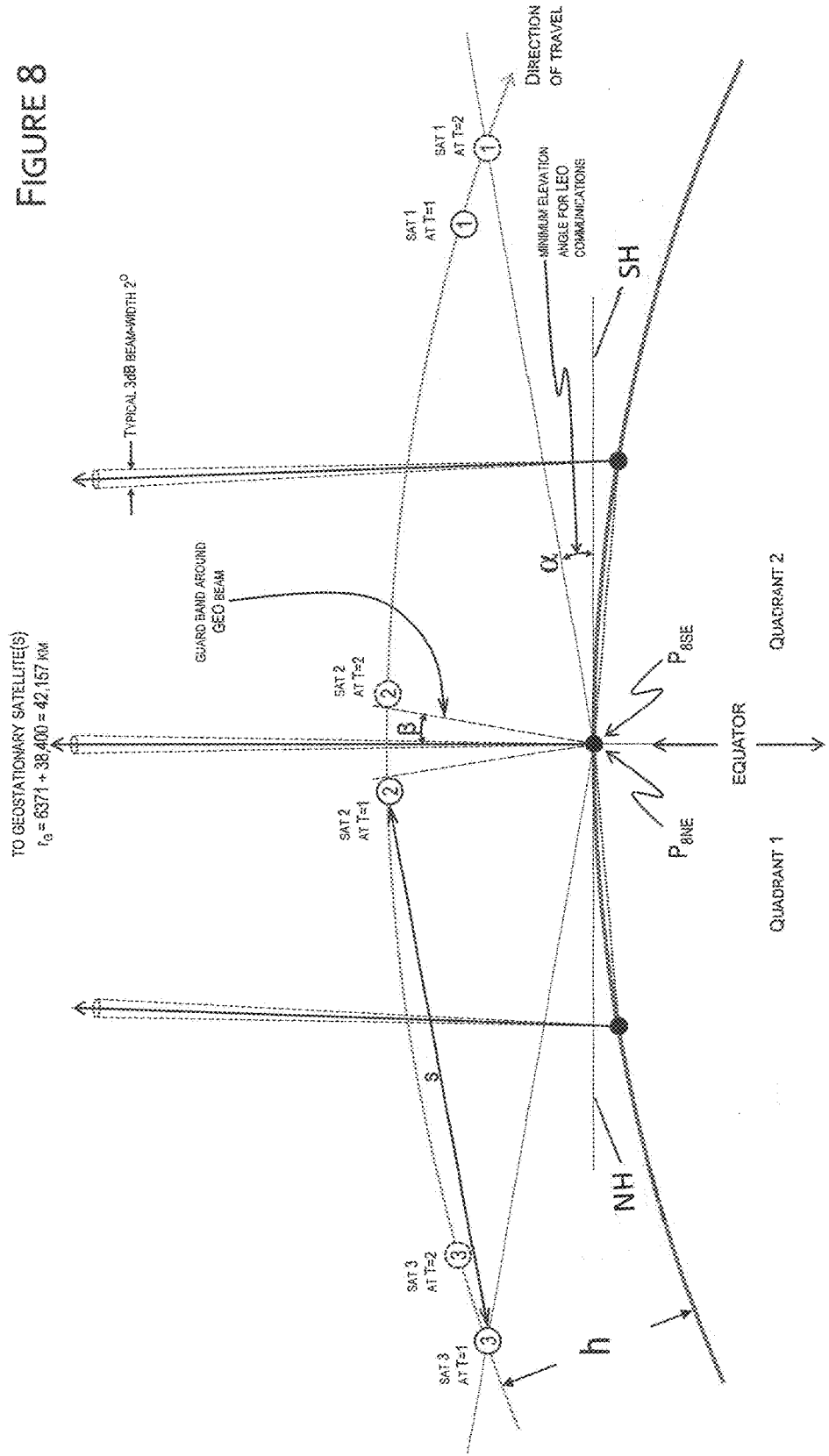
FIG. 8 is a diagram representing the earth showing a portion of one plane to illustrate the invention, and depicts a LEO-based constellation for communications with earth stations anywhere in the world.

FIG. 8 shows one portion of one plane of the invention, which comprises a LEO-based constellation for communications with earth stations anywhere in the world, and which can operate simultaneously in spectrum allocated for GEO-to-earth station use, including to an earth station at the same time and place, which operates as will be further described below. FIG. 8 shows three satellites (represented by the circles designated 1, 2 and 3) in one orbital plane at two different conceptual times, called T=1 and T=2, operating near the equator to service a ground station at the equator. The satellites 1, 2 and 3 at time T=1 are represented by solid line circles and at time T=2 are represented by broken line circles. Operations near the equator are the limiting case for the invention, and so are shown in detail and the focus of much of the disclosure. In FIG. 8, one of the satellites labeled "2" approaches the equator at T=1, and then crosses the equator, with point P8NE below it. In this Figure, the point P8SE is introduced, being the nearly identical point to P8NE, except just south of the equator whilst P8NE is just north of the equator. The northern horizon is indicated as NH and the southern horizon as SH.

In the disclosed invention, as satellite 3 rises above the northern horizon NH by a chosen angle α with respect to an earth station at P8NE at the equator, satellite 3 is able to create a communications link with P8NE. At the same time T=1, excepting a necessary time for hand-off, satellite 2, which was previously serving communications with P8NE, ceases its communications with P8NE as it enters P8NE's GEO satellite guard band. As satellite 3 continues ascending across P8NE's northern sky, it continues serving any communications needs of P8NE, which can be on the same frequency as that used with any GEO satellite, without interfering with any communications which may be ongoing with said GEO satellite, until it arrives at the position indicated of satellite 2 at T=1. At that time a satellite 4 (not shown) will begin rising above the northern horizon with respect to P8NE, so that satellite 3 can turn off its communications link with P8NE while it transitions across P8NE's GEO guard band.

Meanwhile, as satellite 2 comes out of the guard band of P8NE at T=2, it can begin serving P8SE, which is assumed at the same place on the equator as P8NE, except south of the equator. Prior to satellite 2 beginning service of P8SE, P8SE was served by satellite 3, which is setting to the south, with respect to P8SE. In the same way, every point around the globe is covered by a satellite in the constellation.

Figure 9:
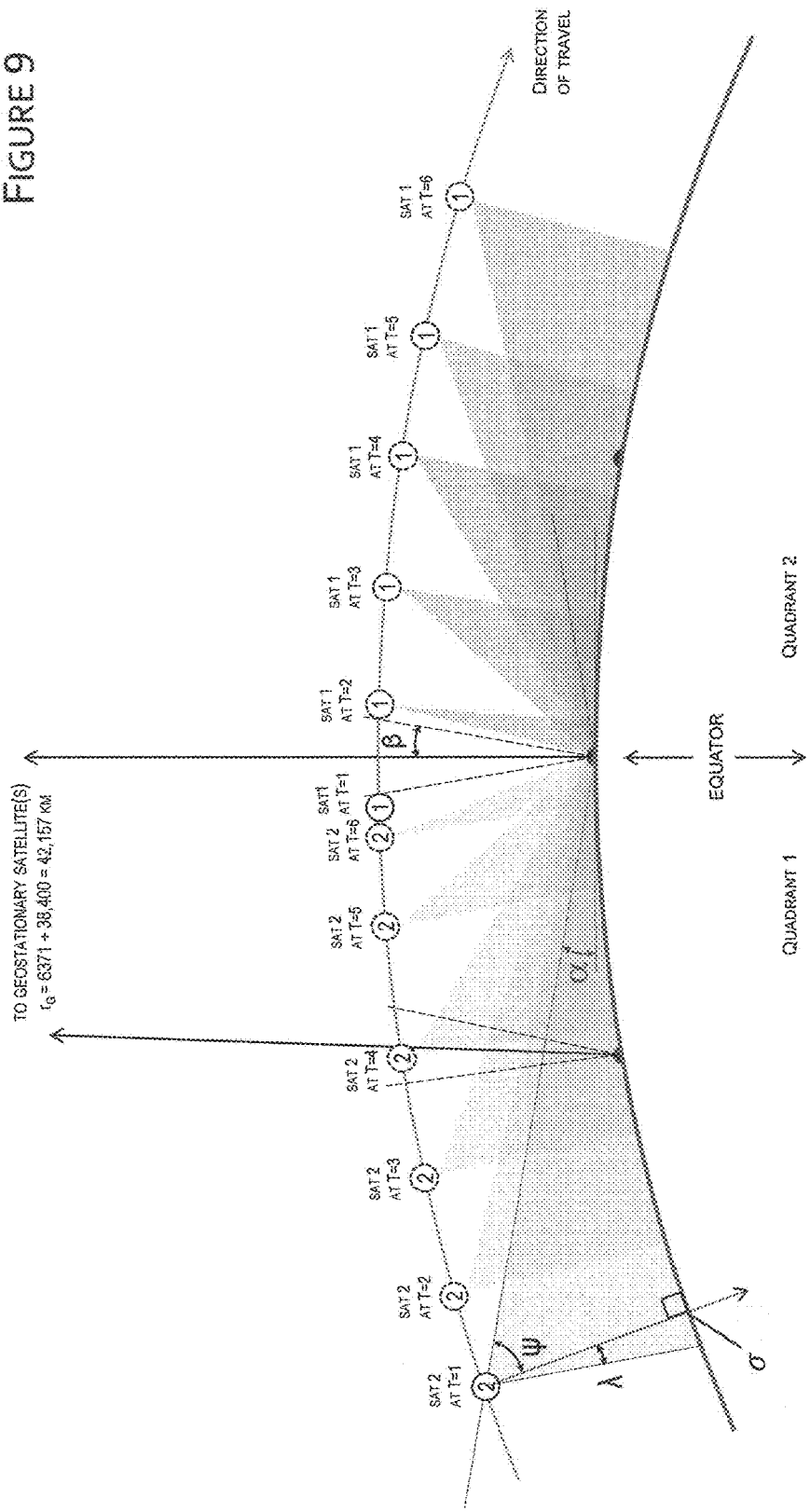
FIG. 9 is a diagram representing the earth and illustrating communications beams associated with two satellites according to the invention which are depicted transitioning across the sky over the equator from North to South.

Referring now to FIG. 9, the communications beams associated with two satellites in the disclosed invention are described as they transition across the sky over the equator from North to South. As stated previously, the beams described are the antenna patterns created by real-time adjustable beam antennas on the LEO satellites, such as can be created with phased array antennas, which are well known and understood to those practiced in the art. As also previously stated, the beam envelopes may have within each of them various sub-beams for specific frequency-reuse, polarization re-use or accommodation of other orbital elements or earth station elements which are nevertheless within the scope of the invention.

Referring still to FIG. 9, the forward beam angle with respect to the satellite is indicated as angle ψ and the backward angle of the beam is indicated as angle λ.

As indicated in FIG. 9, around the descending semi-circle of the polar orbit of the LEO communications satellite, for that portion during which a satellite is in quadrant 1, the LEO projects its communications beam forward in the direction it is travelling, continuously, at an angle of ψ, which can be as large an angle as reasonable or feasible for communications with earth stations until the satellite's latitude, σ, reaches a so-called latitude limit, as it approaches the equator. With respect to the forward portion of the beam, as it approaches the equator, the control means of the LEO satellite's directional antenna begins to reduce the forward angle of its forward beam as indicated as the satellite labeled SAT2 progresses from T=1 to T=6 toward the equator.

Also in FIG. 9, now noting the satellite labeled SAT1, as it progresses from T=1 to T=6, its beam is extinguished over the equator and no communications occur with that satellite from any ground station while it transits across the GEO guard band at the equator. After crossing the equatorial guard band into quadrant 2, the SAT1 then expands what is now the backward pointing portion of its communications beam as indicated, such that when the satellite has reached the latitude limit angle away from the equator, the backward beam cover a maximum region behind it, as a mirror image to the forward beam communications coverage area produced in quadrant 1.

Figure 10A:
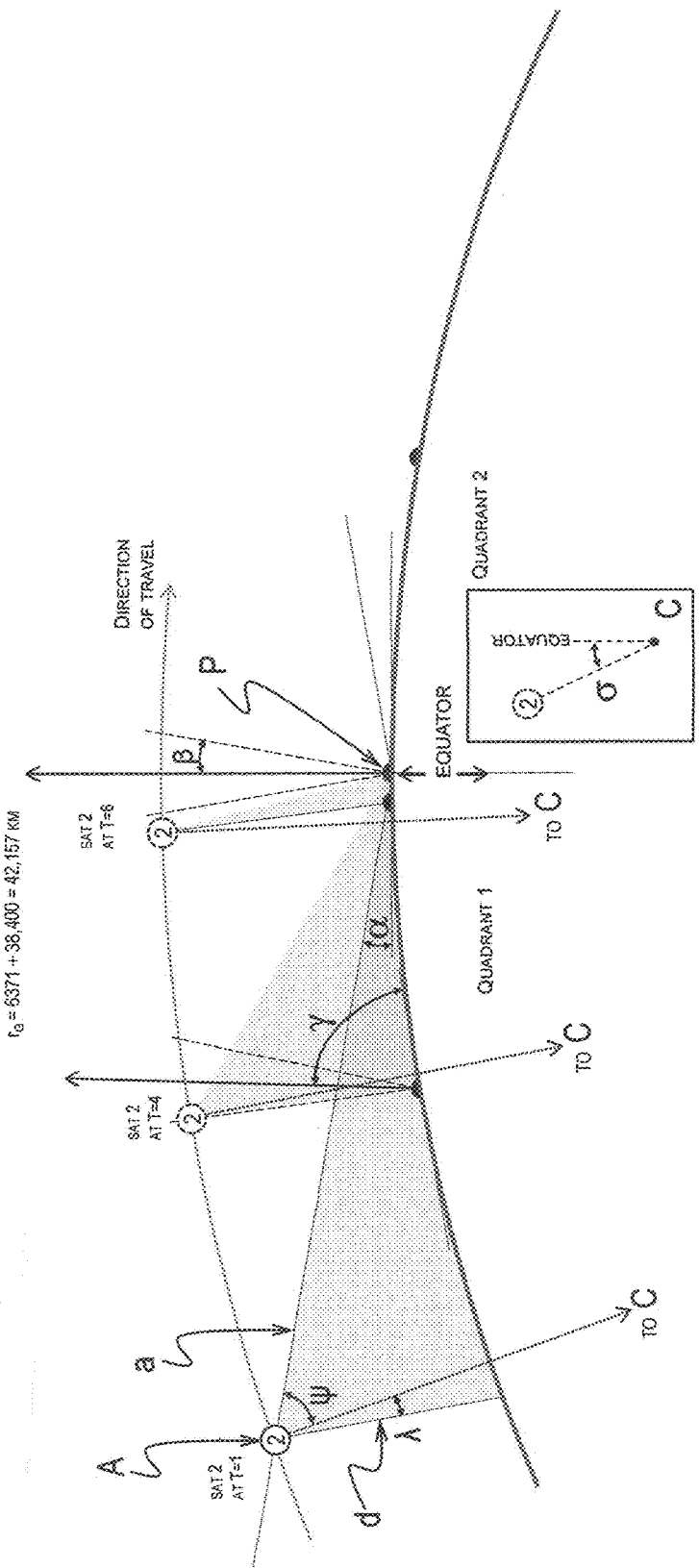
FIG. 10A is a diagram representing the earth and illustrating the latitude of a satellite at any particular point in its orbit, σ.
Figure 10B:
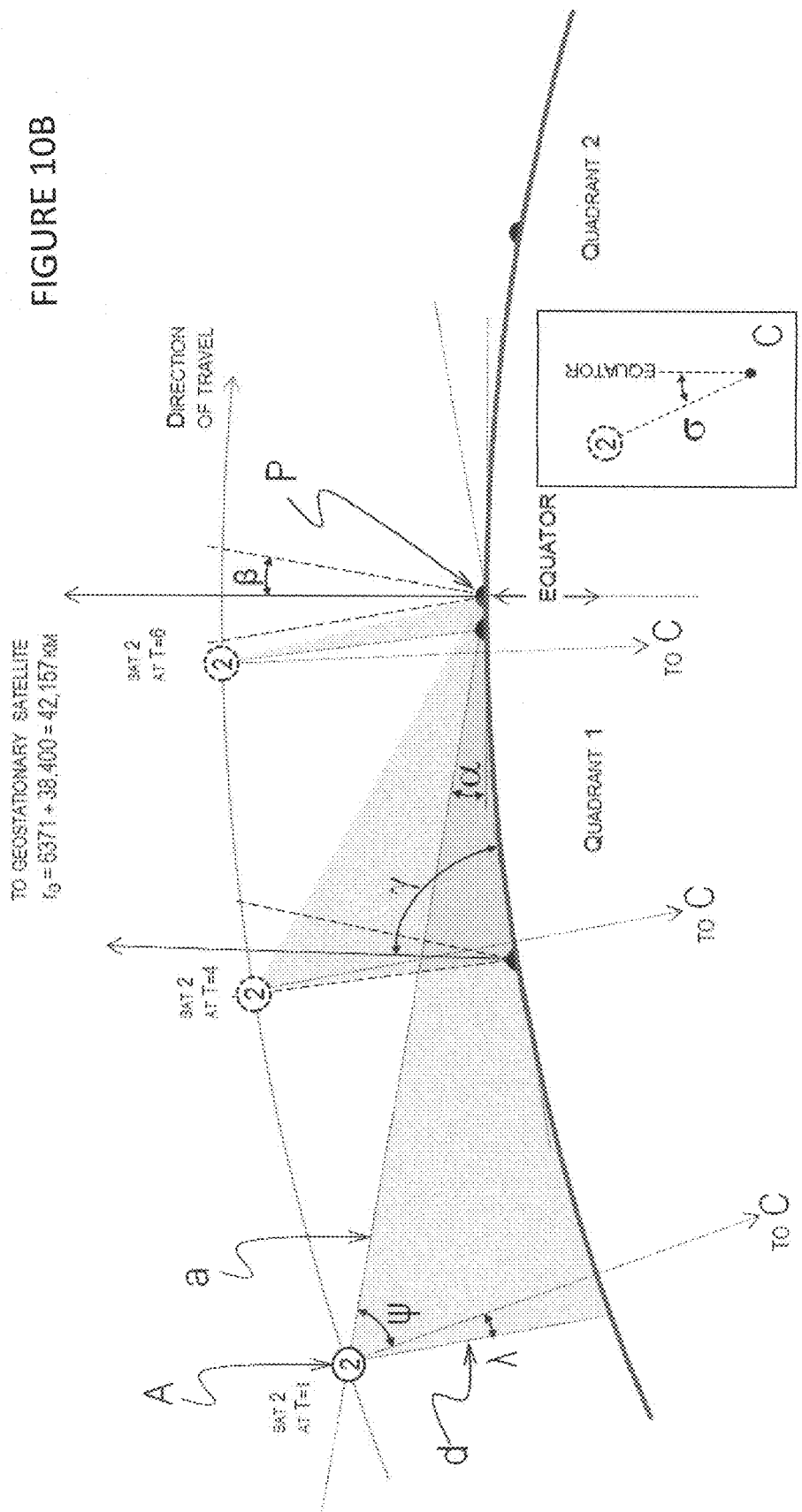
FIG. 10B is an enlarged view of the diagram of FIG. 10A.

Each satellite also controls the angle, λ, of a so-called backward beam as shown in FIGS. 10A, 10B. FIGS. 10A, 10B also indicate the latitude of the satellite at any particular point in its orbit, σ. The parameters and labels α, β, γ, A, P, C, a, and d are as previously discussed with respect to FIGS. 6 and 7, and Equations 5 through 15 are operative as previously described with respect to FIGS. 6 and 7 to compute the relevant geometric angles and lengths of the triangles. Once the lengths a and d are found, the Equations 17, 18 and 19 are employed to calculate ψ at the latitude limit and λ as a function of σ, for a given β and γ. Equations 14 through 19 are set forth below (the equation number appearing next to the equation, in parentheses).

$$s^2 = a^2 + d^2 - 2ad\cos\omega_2 \tag{14}$$

$$s = \sqrt{a^2 + d^2 - 2ad\cos\omega_2} \tag{15}$$

$$\frac{\sin\psi}{r_E} = \frac{\sin(90+\alpha)}{r_L} = \frac{\sin\sigma}{a} \tag{16}$$

$$\sigma = \sin^{-1}\left(\frac{a\sin(90+\alpha)}{r_L}\right) \tag{17}$$

$$\psi = \sin^{-1}\left(\frac{r_E\sin(90+\alpha)}{r_L}\right) \tag{18}$$

$$\lambda = \sin^{-1}\left(\frac{r_E\sin(90+\gamma+\beta)}{r_L}\right) \tag{19}$$

Tabulations of the various parameters appear in Table 1 (FIG. 14) for the input parameters of α=5 degrees, β=5 degrees and h=1,800 km. For those parameters, the computations outlined in red define the primary elements of the disclosed invention, and the implementation of the satellite antenna control mechanism which regulates the beam and/or sub beam projection, showing: that 11 satellites are required in each polar orbital plane, that the maximum forward beam angle required is 50.96 degrees, that the forward beam should begin limiting at a satellite latitude of 34.04 degrees (maintaining pointing to just past the equator as it approaches the equator), and that the angle of the back beam λ should track the values indicated in the columns titled with λ and σ, where σ to the left of the long black line is treated as a dependent variable based on the LEO sat communicating with an earth station P as indicated in the first column. Notice that as the equator is approached, the back beam angle becomes negative, indicating that the back beam must begin pointing somewhat ahead of the satellite, rather than behind it, as the satellite nears the equator, in order to avoid transmitting down the bore sight of an antenna pointed at a GEO satellite. In the limiting case where $\beta=0$, the back angle never goes negative and the back beam angle $\lambda$ at the equator is 0 (this situation is shown in Table 2, FIG. 15). The columns under $\sigma$ and $\psi$ to the right of the long black line in Table 1 (FIG. 14) compute the forward beam angle as a function of the latitude of the satellite, where now the latitude of the satellite is treated as an independent variable.

To show how the disclosed invention is applicable to other parameters, Table 3 (FIG. 16) shows the computations for input parameters of $\alpha=10$ degrees, $\beta=10$ degrees and h=800 km. For those parameters the computations show: that 21 satellites are required in each polar orbital plane to implement the method, that the maximum forward beam angle required is 61.04 degrees, and that the forward beam should begin limiting at a satellite latitude of 18.96 degrees (maintaining pointing to just past the equator as it approaches the equator). For example, still referring to Table 3 (FIG. 16), when one of the satellites in the constellation approaches the equator in quadrant 1, when its latitude references to the center of the earth is at 8.06 degrees North, its back beam must be −0.05 degrees or less, therefore actually then the back beam is pointing forward.

As can be seen in FIGS. 9 and 10, as one of the satellites in the constellation approaches the equator, its overall beam width declines by the governing equations to zero. However, as the beam width approaches zero, there is some practical limit for realizable satellite antennas. This practical limit can change based on implementation methods for the antenna and its associated control function, and at that limit the beam can simply be turned off (no longer transmitting). Any additional margin associated with such minimum beam width can be accommodated by adjusting the guard band, $\beta$.

The satellites may be configured with a satellite control mechanism that controls the satellite operations. For example, the control mechanism may determine the position of the satellite, including its latitude, and may use the latitude position to regulate the beam projected form the satellite. According to some embodiments, the satellite control mechanism preferably includes computing components that are carried by the satellite. The computing components preferably include a computer that is provided with software that includes instructions for monitoring the positions of the satellite along its orbit and regulating beams projected by antennas of the satellite. Any suitable mechanism for directing the beam of the antenna may be employed, including mechanical or electronic controls that limit, expand, direct, or combine these methods to regulate the beam angle. The beam also may be formed from sub-beams. The satellite may be provided with one or more real-time adjustable beam antennas, such as, for example, a phased array antenna, or other antennas that are known in the art. The satellite antennas may generate beam envelopes that may comprise various sub-beams for specific frequency-reuse and/or polarization re-use. According to some embodiment, the beam envelope sub-beams may be configured to accommodate other orbital elements and/or earth station elements. According to preferred embodiments, the satellite is configured to produce one or more beams, and preferably, a beam may be provided with one or more forward portions, and one or more rearward portions (for example, where a beam forward portion may comprise a first beam, and a beam rearward portion may comprise a second beam). The beam portion may be regulated (e.g., by turning it on or off) to limit the beam field or projection. According to some embodiments, the satellite control mechanism may be powered using the power source of the satellite. According to some embodiments, the system components may be powered with solar panels that may be deployed on the satellite for this and other purposes. The satellite beam control mechanism preferably includes computing components configured to process the satellite location information, and determine the beam angle to be provided by an antenna, such as, for example, a transmitting antenna of the satellite. The control mechanism preferably manipulates the beam angle in accordance with determinations from the satellite location information and the application of the positioning as set forth herein, and, in particular, according to the embodiments provided represented by the equations herein (see e.g., Equations 5 through 13). Satellites may be provided with suitable antennas for communications with earth stations. For example, phased array antennas, helical antennas, or other suitable antennas may be provided. In addition, the satellites may be configured to communicate with other satellites. Suitable antennas, such as lenses for satellite cross-link communications may be provided. For example, adjacent satellites may communicate with each other. The satellites also may be provided with devices for routing signals, such as, communications and data. For example, the satellite may be configured with one or more switching units that process information as to the communication destination, and route the communication through an appropriate satellite. According to some embodiments, the satellites are configured to route communications to an earth station within the beam range of the satellite, and the earth station may be connected to a network that routes the communication to a designated destination. Similarly, transmissions from an earth station may be received by a satellite, and the satellite may route that communication to a destination, such as, a device. For example, according to some embodiments, the satellites and the satellite system preferably may transport of datagrams between any satellite and a ground terrestrial network. Earth stations, which may be configured as or in association with a gateway station may receive and transmit signals, such as datagrams, between a satellite. This may be carried via immediate re-transception of the datagram to a gateway station in view of the same satellite (i.e., bent pipe), where the data is transmitted to the satellite from an earth station or gateway, and the satellite sends it right back down again. In some embodiments, the signal or data may be sent without modification, other than processing to retransmit the signal back (which may involve one or more of signal amplification, shifting the uplink/downlink frequency for the re-transmission. According to other embodiments, the satellite may be configured with equipment that may be used to carry out on-board processing of the signal, such as for example, to demodulate, decode, re-encode and/or modulate the signal (e.g., through a regenerative transponder). According to some preferred embodiments, transport of datagrams between any satellite and a ground terrestrial network may be carried out via a crosslink to one or more other satellites in the satellite constellation, and then from these other satellites to a gateway. For example, the intended gateway may not be in view of the first satellite at any particular time, but may be in view of one of the other satellites of the satellite constellation. A satellite in view of the gateway may receive a datagram routed from another satellite (e.g., the first satellite). The satellites of the constellation preferably may be configured to crosslink, and route transmissions through their respective cross-links.

The equations and tables may be re-arranged with straightforward mathematical manipulations well known to those practiced in mathematical arts, to enable any particular parameter shown to be a free variable, allowing the rest of the satellite constellation orbital elements and satellite antenna pointing arrangements to be computed thereafter, without going outside of the scope of the present invention.

It is readily understood from the symmetry of the disclosed invention that the satellites operate in mirror image of each other in each quadrant. That is, the geometry, antenna patterns and operation of the satellites in a plane in quadrant 1 are mirrored around the equator to generate quadrant 2, which is then mirrored around the North-South axis of the earth to generate quadrant 3, and then mirrored up around the equator to generate quadrant 4. The details of a satellite crossing the equator have been presented in detail as this is the place of highest potential for interference, and this when crossing the equator, the most effective interference avoidance technique is to simply have the equator-overpassing satellite cease transmitting to the earth stations when within the guard band around the GEO pointing vector. This also permits the satellite sufficient time to re-orient the antenna system to the subsequent quadrant. When a satellite is over the poles, it must also re-orient its antenna pointing system however the mechanics of that can be performed in an unconstrained way in any manner suitably designed by those practiced in the art, because there are no geo-stationary communications possible at the poles, since no geostationary satellite can be in view from the poles.

It should be noted that the drawings in FIGS. 8, 9 and 10 imply that the LEO communications beam intersects the ground at exactly the equator. In practical implementation, the beam would extend forward beyond the equator as the satellite approaches the equator, by an extent necessary to accommodate various uncertainties in orbit and antenna patterns, as well to accommodate the time necessary to handoff from the other LEO satellite as it enters the guard zone over the equator. This practical matter is easily accommodated without going outside of the scope of the invention.

An option that complicates the design of the satellite antenna and antenna control system is as follows, but remains within the scope of this invention. The beam envelope which has been disclosed above is typically composed of many sub-beams. Certain sub-beams may be turned off or re-directed as the satellite passes over or near the equator, enabling additional communications support for areas above and below the equator, without causing the satellite to cease all transmission to earth stations. This option however requires careful control of side lobes of the satellite antenna pattern, which can add expense and may not be technically possible for certain antenna implementation methods.

Because the orbit of the disclosed satellite constellation is polar, the azimuth plane of the LEO satellite constellation can be operated independently of the elevation plane which has been thoroughly described herein. As such, the number of planes for complete global coverage can be designed as an independent variable with respect to the operation of the satellites and their antenna patterns in a plane. For example, the LEO-based communications system can be designed to cover 30 degrees of longitude to the right or left of the plane of orbit, while simultaneously operating as provided for in this disclosure, and as above with respect to Table 1 (FIG. 14) for example, within the plane of orbit.

FIG. 11 shows a complete satellite constellation (not to scale) which complies with the specifications of Table 1 (FIG. 14), with 11 satellites per plane and 6 planes (only three being depicted in the Figure), at an orbit height of 1800 km, in the required polar orbit. As seen in FIG. 11, each plane may be populated such that the satellite within the plane have the equator crossing time of each satellite slightly offset from the neighboring plane, which, depending on plane spacing selected, may provide further assistance to cover earth stations near the equator which are closer to a neighboring orbital plane.

The method of onward communications between the class of LEO communications constellations disclosed herein and a further earth terminal or earth gateway is flexible and may be either via an earth gateway within view of each satellite in a so-called bent pipe architecture, or may be via a cross-linked architecture, such as that employed by the Iridium satellite constellation. Both implementations are possible with the disclosed invention, and either may be employed to complete a communications link between an earth station, a satellite operated within a satellite constellation as disclosed herein, and another earth station, or other terrestrial data or communications network.

In addition to the isolation provided between the GEO communications satellites, GEO-involved earth stations and the LEO-based communications system disclosed herein that is provided by the geometry of the operations and the antenna system, there are additional features of the disclosed system related to the earth stations which communicate with the LEO satellites which can now be described. When an earth station transmits up to a LEO satellite in the disclosed system, the transmission must only overcome the distance to the LEO satellite, which requires considerably less signal power than that required to overcome the distance to a GEO satellite at the same frequency. This situation is shown in Table 4 of FIG. 17, which shows the free space path loss (FSPL) in-plane calculated for various angles from a LEO satellite in a constellation orbiting at an 800 km altitude to an earth station, compared to the FSPL to a GEO satellite, at the same communications frequency of 12 GHz (Ku Band). The calculations show a minimum difference in path loss of 33 dB. The difference in path loss provides a significant link margin to further reduce the possibility that a signal transmitted by an earth station with an omnidirectional antenna which is intending to transmit only to a LEO satellite is nevertheless recognized by a GEO satellite listening on the same frequency, thereby causing an interference with the GEO satellite communications system.

Referring still to Table 4 shown in FIG. 17, the same path loss data provides the basis for the ability of an earth station associated with the LEO satellite communications constellation which has an omnidirectional antenna to avoid interference to it from a GEO-based communications signal. Because the LEO satellite is isolated from GEO-based receiving stations by geometry, the LEO satellite may transmit at powers such that the signal power received on-ground by the earth stations associated with the LEO system may be much higher than the same power received by an omnidirectional antenna at the same frequency from a GEO system, thus providing the ability for the LEO-associated earth station to reject the much weaker signal from the GEO satellite, by means commonly known to those practiced in the art of receiver design.

Notwithstanding the previous paragraph, additional link margin may be desired to accommodate wider operating envelopes in a given system design. Therefore, the LEO system disclosed may be paired with earth stations which are designed to communicate solely with the LEO satellites, even though they are communicating on the same frequency as an earth station communicating with a GEO satellite right next to it. One additional optional element of the LEO satellite based communications system disclosed is to add a directional antenna to the earth station. While a fully azimuth and elevation directional antenna with a small beam width is an option, such an antenna is often prohibitive in cost, size, weight or power for certain applications. However, with the LEO satellite operating as described above provides for a communications direction that is always pointing towards the North in the Northern hemisphere, and pointing South in the Southern hemisphere. This fact enables a dramatically simpler directional antenna to be employed by the earth station. The in-plane antenna pattern of a simple loop antenna, which is oriented perpendicular to the ground, is shown in FIG. 12. Even this simple antenna provides as much as 12 dB of additional link margin at a point P on the equator, and even more for higher latitudes. The only requirement on the earth station is that the direction of the antenna's highest gain be pointed generally South, if the earth station is in the Southern hemisphere, or generally North, if the earth station is in the Northern hemisphere.

Referring now to FIG. 13, it is shown that by pointing the maximum antenna gain away from the direction of the GEO satellite, and towards the direction of the LEO satellite, additional margin is obtained to assist in minimizing the possibility that the LEO earth station's transmissions is received with sufficient power by a GEO satellite system to be recognized. The requirement to be generally pointing North or South, depending only on which hemisphere the earth station is in, is a much simpler requirement on an earth station directional antenna than the requirement to be fully azimuth and elevation directional capable, thus making the LEO-based system disclosed more economical for mass deployment. Other similar patterns from other types of antennas can be created which are well known to those practiced in the art of directional antennas which can provide for the same or greater additional margins with economical implementations, without departing from the scope of this disclosure.

References are made to an earth station that receives and transmits communications between it and LEO satellites. The earth station may include antennas that are located on earth to receive transmissions from and/or send transmissions to LEO satellites. The antennas of the earth station may be any suitable antennas for receiving and/or transmitting suitable frequencies, and in particular RF frequencies to and from LEO satellites. Each LEO satellite may be configured with one and preferably a plurality of antennas. For example, an LEO satellite may have a first antenna that transmits a forward beam in a forward direction and a second antenna that transmits a rearward beam in a rearward direction (e.g., relative to the satellite orbit direction), where the antennas may be independently controlled, and may restrict or expand their respective beams or extinguish them. Satellite antennas may comprise one or more phased array antennas. For example, the phased array antenna may be configured with a number of individual radiating elements that are controllable to control the beam coverage, and in particular the beam configuration and angle. A computer on the satellite, which, according to some embodiments, may comprise a dedicated computer programmed with instructions for manipulating the beam angle (which, for example, may include software stored on a chip or other circuitry component that contains the instructions), may be used to control the antenna array to generate a beam projection that may be increased or decreased in accordance with the satellite orbit, and which may be carried out to maximize the coverage for an antenna. The computer preferably is configured with software containing instructions to regulate the operation of the antenna to eliminate transmissions that may otherwise interfere with GEO satellite communications (including where the LEO satellite and GEO satellite transmissions use the same spectrum). This may be carried out by controlling the beam angles of the projections from the antennas as well as turning off the antennas as needed (e.g., when within the guard band range of a GEO earth station antenna). According to some preferred embodiments, the computer may be configured to manipulate the beam projections in accordance with the determinations set forth herein. The satellite beams preferably are manipulated mechanically, electronically, or by both ways, to generate a desired beam of coverage and avoid transmissions within the guard band of a GEO satellite antenna (e.g., of a GEO earth station).

These and other advantages may be realized with the present invention. While the invention has been described with reference to specific embodiments, the description is illustrative and is not to be construed as limiting the scope of the invention. Various modifications and changes may occur to those skilled in the art without departing from the spirit and scope of the invention described herein and as defined by the appended claims.

LIST OF EQUATIONS REFERENCED

| Description | Equation | Label |
|---|---|---|
| Equations for FIG. 3, to compute $\gamma$ as a function of latitude $\phi$ | $g = r_G \left[ 1 + \left(\frac{r_E}{r_G}\right)^2 - 2\left(\frac{r_E}{r_G}\right)\cos\phi \right]^{\frac{1}{2}}$ | Equation 1 |
| Equations for FIG. 4, to compute the angle $\theta$ between two LEO satellites as a function of s, the line-of-sight distance between them while in orbit | $\gamma = \cos^{-1}\left[\frac{r_G}{g}\right]\sin\phi$ | Equation 2 |
| | $s = 2 \sin\left(\frac{\theta}{2}\right)$ | Equation 3 |
| | $\theta = 2 \sin^{-1}\left(\frac{s}{2r_L}\right)$ | Equation 4 |
| Equations for FIGS. 6A, 6B to find d using cosine law on triange C-$P_1$-D | $\omega_1 = (90 + \gamma + \beta)$ | Equation 5 |
| | $r_L^2 = d^2 + r_E^2 - 2r_E d \cos\omega_1$ | Equation 6 |
| | $d^2 - 2r_E d \cos\omega_1 + (r_E^2 - r_L^2) = 0$ | Equation 7 |

LIST OF EQUATIONS REFERENCED

| | | |
|---|---|---|
| Equations for FIGS. 7A, 7B to find d using cosine law on triangle C-P$_8$-D | $$d = \frac{2r_E \cos \omega_1 \pm \sqrt{[2r_E \cos \omega_1]^2 - 4(r_E^2 - r_L^2)}}{2}$$ For FIGS. 7A, 7B for the same result, one may substitute $\omega_1 = (180 - \beta)$ | Equation 8 |
| Equations for FIGS. 6A, 6B to find a using cosine law on triangle C-P$_1$-A | $\omega_3 = (90 + \alpha)$ $r_L^2 = a^2 + r_E^2 - 2r_E a \cos \omega_3$ $a^2 - 2r_E a \cos \omega_3 + (r_E^2 - r_L^2) = 0$ | Equation 9 Equation 10 Equation 11 Equation 12 |
| Equations for FIGS. 7A, 7B to find a using cosine law on triangle C-P$_8$-A | $$a = \frac{2r_E \cos \omega_3 \pm \sqrt{[2r_E \cos \omega_3]^2 - 4(r_E^2 - r_L^2)}}{2}$$ | |
| Equations for FIGS. 6A, 6B to find s using cosine law on triangle A-P$_1$-D | $\omega_2 = (180 - \alpha - \gamma - \beta)$ $s^2 = a^2 + d^2 - 2ad \cos \omega_2$ | Equation 13 Equation 14 Equation 15 |
| Equations for FIGS. 7A, 7B to find s using cosine law on triangle A-P$_8$-D | $s = \sqrt{a^2 + d^2 - 2ad \cos \omega_2}$ For FIGS. 7A, 7B, for the same result one may substitute $\omega_2 = (90 + \alpha + \beta)$ | |
| Equations for FIGS. 10A, 10B to find $\lambda$, $\sigma$ and $\psi$ for LEO at position A | $$\frac{\sin \psi}{r_E} = \frac{\sin(90 + \alpha)}{r_L} = \frac{\sin \sigma}{a}$$ | Equation 16 |
| | $$\sigma = \sin^{-1}\left(\frac{a \sin(90 + \alpha)}{r_L}\right)$$ | Equation 17 |
| | $$\psi = \sin^{-1}\left(\frac{r_E \sin(90 + \alpha)}{r_L}\right)$$ | Equation 18 |
| | $$\lambda = \sin^{-1}\left(\frac{r_E \sin(90 + \gamma + \beta)}{r_L}\right)$$ | Equation 19 |

What is claimed is:

1. A low earth orbiting satellite constellation for communications, which comprises
   a) a plurality of satellites in a polar orbit about the earth;
   b) the satellites being arranged in a sufficient number of orbital planes to provide coverage for substantially every point on earth for communications and substantially at all times, and
   c) wherein the number of satellites in each orbital plane is sufficient to provide communications over the range of the orbital plane;
   d) wherein each satellite has an antenna for receiving and transmitting to earth stations, and wherein the satellite antenna is controlled to avoid transmitting down the bore sight of a GEO-pointing antenna at any point on earth;
   e) wherein the satellite orbital plane comprises an orbital plane defining a polar orbit about the four quadrants of the earth, wherein the satellite has a pointing control, and wherein the pointing control in the first quadrant follows an algorithm to direct satellite transmissions to maximize the coverage and avoid transmitting down the boresight of a GEO-pointing antenna;
   f) wherein the satellite pointing control directs the satellite transmission coverage in each quadrant of the plane of orbit to mirror the satellite transmission coverage of the rearward directed beam projected in the prior quadrant of the satellite orbit;
   g) wherein the transition between quadrants at the equator includes the satellite turning off its transmitter towards the earth so as to avoid transmitting down the bore sight of an antenna pointing towards a GEO satellite; and
   h) wherein the transmission between satellites and an earth station is carried out using spectrum also employed by GEO communications satellites communicating in the same region.

2. The system of claim 1, wherein the means of transport of datagrams between any satellite and a ground terrestrial network is via immediate re-transception of the datagram to a gateway station that is located in view of the same satellite.

3. The system of claim 1, wherein the means of transport of datagrams between any satellite and a ground terrestrial network is via a crosslink to one or more other satellites in said constellation and then from said other satellites to a gateway, wherein the gateway is not in view of the first satellite at any particular time.

4. The system of claim 3, wherein said satellites comprise switching means for switching transport of datagrams between satellites, wherein the switching means associated with a satellite is configured to hand-off transmission of datagrams to switching means associated with another satellite.

5. The system of claim 1, wherein the associated earth station associated to transmit datagrams between the earth station and a satellite employs an omnidirectional antenna.

6. The system of claim 1, wherein the associated earth station associated to transmit datagrams between the earth station and a satellite employs a directional antenna that is directional northerly or southerly with respect to the orbital plane of the constellation of satellites.

7. The system of claim 5, wherein the antenna is directional in both elevation and azimuth.

8. The system of claim 1, wherein the satellites are arranged in a sufficient number of orbital planes to provide coverage for every point on earth.

9. The system of claim 1, wherein the number of satellites in each orbital plane is selected according to the maximum transmission and reception coverage for the satellite altitude and horizon elevation angle.

10. The system of claim 1, wherein said satellite pointing control comprises a control mechanism, and wherein the control mechanism controls the beam from one or more antennas of the satellite to direct satellite transmissions (1) in accordance with a beam projection in the rearward direction being projected at a rearward beam angle of angle λ, which for an acute angle γ between the horizon and the vector at a location of a point on earth where a GEO earth station is pointing to a geostationary satellite, and for a GEO protection guard band angle β around the vector between the GEO earth station and the GEO satellite to which it points, which is at angle γ to the horizon, is determined by the expression:

$$\lambda = \sin^{-1}\left(\frac{r_E \sin(90 + \gamma + \beta)}{r_L}\right)$$

where $r_E$ represents the radius of the earth, where $r_L$ represents the radius of the satellite's orbit, where γ represents an acute angle between the horizon and the vector at a location of a point on earth where a GEO earth station is pointing to a geostationary satellite, and where β represents a GEO protection guard band angle around the vector between the GEO earth station and the GEO satellite to which it points, which is at angle γ to the horizon; and (2) in accordance with a beam projection in the forward direction being projected at a forward beam angle of ψ, which for a given latitude position in the satellite's orbit, is determined by the expression:

$$\psi = \sin^{-1}\left(\frac{r_E \sin(90 + \alpha)}{r_L}\right)$$

where $r_E$ represents the radius of the earth, where α represents the horizon elevation angle, and where $r_L$ represents the radius of the satellite's orbit.

11. The system of claim 10, wherein the projections from the satellite are controlled to maximize the coverage, and wherein the projections from the satellite are controlled to avoid transmitting down the boresight of a GEO-pointing antenna.

12. The system of claim 1, wherein the satellite has a control mechanism that controls the satellite transmitter, and wherein the satellite antenna is controlled to avoid transmitting down the bore sight of a GEO-pointing antenna with said control mechanism at any point on earth by the control mechanism, said control mechanism being configured to turn off the transmitter at locations where transmissions from the transmitter would coincide with the boresight of a GEO earth station antenna pointing towards a GEO satellite.

13. The system of claim 12, wherein each satellite is configured to turn off its transmitter that transmits toward the earth at the transition between quadrants at the equator, so as to avoid transmitting down the bore sight of an antenna pointing towards a GEO satellite.

14. The system of claim 1, wherein the LEO satellites provide communications links, and wherein a satellite of the constellation of LEO satellites approaching a boresight of an antenna of a GEO satellite earth station or a GEO satellite guard band that is within the orbital plane of the approaching satellite is configured to hand-off communications to another of the LEO satellites that is not within the boresight of an antenna of a GEO satellite.

15. The system of claim 1, wherein said LEO satellite antenna for receiving and transmitting to earth stations comprises a real-time adjustable beam antenna.

16. The system of claim 1, wherein the satellite transmits a beam that is projected from the antenna, said beam having a forward direction and a rearward direction relative to the satellite movement within the orbit.

17. The system of claim 1, wherein the satellite transmits a beam that is projected from the antenna, and wherein said beam has a forward pointing portion and a rearward pointing portion.

18. The system of claim 16, wherein the satellite antenna comprises a directional antenna; wherein the satellite beam in the forward direction is projected at a forward beam angle of ψ, and wherein the satellite beam in the rearward direction is projected at a rearward beam angle of λ; wherein said satellite directional antenna is manipulated to reduce the forward beam angle of ψ as the LEO satellite moves toward a latitude limit.

19. The system of claim 18, wherein the satellite directional antenna is manipulated to decrease the forward beam angle of ψ as the LEO satellite moves as the satellite moves toward a latitude limit angle away from the equator.

20. The system of claim 18, wherein the satellite directional antenna is manipulated to increase the rearward pointing beam angle of λ as the satellite moves away from the equator.

21. The system of claim 18, wherein the satellite directional antenna is manipulated to increase the rearward pointing beam angle of λ as the satellite moves away from a GEO earth station guard band.

22. The system of claim 18, wherein the satellite directional antenna is manipulated to increase the rearward pointing beam angle of λ as the satellite moves away from the boresight of a GEO earth station.

23. The system of claim 17, wherein the satellite communication beam forward portion of a satellite beam has a forward beam angle that is adjusted as a function of the latitude of the satellite.

24. A low earth orbiting satellite constellation communications system, comprising:
  a) a plurality of low earth orbiting satellites in a polar orbit, the polar orbit covering four quadrants of the earth;
  b) communications processing equipment provided on each satellite, said communications processing equipment comprising a processor and circuitry for receiving and transmitting signals between an earth station and one or more satellites of the satellite constellation;
  c) wherein each satellite has at least one antenna for receiving and transmitting to earth stations; and
  d) wherein said antenna is controllable to avoid transmitting down the boresight of a GEO-pointing antenna at any point on earth.

25. The system of claim 24, wherein each of said satellites of the constellation of satellites has a control mechanism for controlling their respective antennas.

26. The system of claim 25, wherein the control mechanism controls at least one antenna to direct the beam from interfering with the boresight of a GEO satellite earth station antenna pointing toward a GEO satellite.

27. The system of claim 26, wherein the control mechanism controls one or more antennas of a satellite to produce a beam in the forward direction projected at a forward beam angle and to produce a beam in the rearward direction projected at a rearward beam angle.

28. The system of claim 27, wherein the satellite beam in the rearward direction is projected at a rearward beam angle that decreases as the satellite moves forward in its directional orbit.

29. The system of claim 27, wherein the satellite beam in the forward direction is projected at a forward beam angle that increases as the satellite moves forward in its directional orbit.

30. The system of claim 28, wherein the satellite beam in the forward direction is projected at a forward beam angle that increases as the satellite moves forward in its directional orbit.

31. The system of claim 28, wherein the satellite beam in the rearward direction is projected at a rearward beam angle of λ, which for an acute angle γ between the horizon and the vector at a location of a point on earth where a GEO earth station is pointing to a geostationary satellite, and for a GEO protection guard band angle β around the vector between the GEO earth station and the GEO satellite to which it points, which is at angle γ to the horizon, is determined by the expression:

$$\lambda = \sin^{-1}\left(\frac{r_E \sin(90 + \gamma + \beta)}{r_L}\right)$$

where $r_E$ represents the radius of the earth, where $r_L$ represents the radius of the satellite's orbit, where γ represents an acute angle between the horizon and the vector at a location of a point on earth where a GEO earth station is pointing to a geostationary satellite, and where β represents a GEO protection guard band angle around the vector between the GEO earth station and the GEO satellite to which it points, which is at angle γ to the horizon.

32. The system of claim 29, wherein the satellite beam in the forward direction is projected at a forward beam angle of ψ, and wherein for a given latitude position in the satellite's orbit, the forward beam angle ψ projected is determined by the expression:

$$\psi = \sin^{-1}\left(\frac{r_E \sin(90 + \alpha)}{r_L}\right)$$

where $r_E$ represents the radius of the earth, where α represents the horizon elevation angle, and where $r_L$ represents the radius of the satellite's orbit.

33. The system of claim 32, wherein the horizon elevation angle consists of the minimum angle between (1) the horizon and (2) the satellite at which the satellite and an earth station to which the satellite may communicate, as viewed from the earth station location.

34. The system of claim 30, wherein the satellite beam in the rearward direction is projected at a rearward beam angle of angle λ, wherein for a given latitude position in the satellite's orbit the rearward beam angle λ projected is determined by the expression:

$$\lambda = \sin^{-1}\left(\frac{r_E \sin(90 + \gamma + \beta)}{r_L}\right)$$

where $r_E$ represents the radius of the earth, where $r_L$ represents the radius of the satellite's orbit where γ represents an acute angle between the horizon and the vector at a location of a point on earth where a GEO earth station is pointing to a geostationary satellite, and where β represents a GEO protection guard band angle around the vector between the GEO earth station and the GEO satellite to which it points, which is at angle γ to the horizon, and where $r_L$ represents the radius of the satellite's orbit, wherein the satellite beam in the forward direction is projected at a forward beam angle of ψ, and wherein for a given latitude position in the satellite's orbit the forward beam angle ψ projected is determined by the expression:

$$\psi = \sin^{-1}\left(\frac{r_E \sin(90 + \alpha)}{r_L}\right)$$

where $r_E$ represents the radius of the earth, where α represents the horizon elevation angle, and where $r_L$ represents the radius of the satellite's orbit.

35. The system of claim 27, wherein the beam produced in the forward direction is comprised of a plurality of sub-beams.

36. The system of claim 27, wherein the beam produced in the rearward direction is comprised of a plurality of sub-beams.

37. The system of claim 27, wherein at least one of the beam produced in the forward direction and the beam produced in the rearward direction is comprised of a plurality of sub-beams, and wherein said sub-beams are controllable to control the projection of the communication beam from said satellite antenna.

38. The system of claim 27, wherein the beam produced in the forward direction is comprised of a plurality of sub-beams, wherein the beam produced in the rearward direction is comprised of a plurality of sub-beams, and wherein said sub-beams are controllable to control the projection of the communication beam from said satellite antenna.

39. The system of claim 37, wherein a sub-beam is controllable by positioning said antenna that provides the sub-beam.

40. The system of claim 37, wherein at least one of said forward beam and said rearward beam is controllable by activating or deactivating a sub-beam comprising the respective forward beam or rearward beam.

41. The system of claim 37, wherein said forward beam is controllable by activating or deactivating a sub-beam comprising the forward beam, and wherein said rearward beam is controllable by activating or deactivating a sub-beam comprising the rearward beam.

42. The system of claim 24, wherein the satellite antenna comprises a real-time adjustable beam antenna.

43. The system of claim 42, wherein the real-time adjustable beam antenna comprises a phased array antenna.

44. The system of claim 42, wherein the antenna provides a beam envelope that is comprised of sub-beams configured for specific frequency-reuse, polarization re-use, or accommodation of other orbital elements or earth station elements.

45. The system of claim 43, wherein the antenna provides a beam envelope that is comprised of sub-beams configured for specific frequency-reuse, polarization re-use, or accommodation of other orbital elements or earth station elements.

46. The system of claim 24, wherein said satellite constellation is provided so that at least one satellite of the satellite constellation is in view at all times from any point P on the earth.

47. The system of claim 26, wherein the satellite beam in the forward direction is projected at a forward beam angle ψ; wherein the satellite beam in the rearward direction is projected at a rearward beam angle of λ; wherein at least one satellite antenna comprises a directional antenna that projects the forward beam, and wherein the at least one directional antenna projecting the forward beam is manipulated to reduce the forward beam angle ψ as the LEO satellite moves toward a latitude limit, wherein at least one satellite antenna comprises a directional antenna that projects the rearward beam, wherein the at least one satellite directional antenna projecting the rearward beam is manipulated to increase the rearward beam angle λ as the LEO satellite moves toward a latitude limit.

48. The system of claim 47, wherein each directional antenna has an associated transmitter that provides a signal to the antenna, and wherein each satellite is configured to turn off an associated transmitter at locations where transmission from its transmitter would coincide with the boresight of an antenna pointing towards a GEO satellite.

49. The system of claim 24, wherein said at least one antenna for receiving and transmitting to earth stations comprises a directional antenna and wherein there is at least one transmitter associated with the directional antenna that provides a signal to the antenna, and wherein each satellite is configured to turn off the associated transmitter at locations where transmission from its transmitter would coincide with the boresight of an antenna pointing towards a GEO satellite.

50. The system of claim 49, wherein the satellite constellation is in a plane of orbit over four quadrants of the earth defining four respective quadrants of the plane of orbit, and wherein the equator defines a transition between quadrants of the plane of orbit.

51. The system of claim 50, wherein each satellite is configured to turn off its transmitter that transmits toward the earth at the transition between quadrants at the equator, so as to avoid transmitting down the bore sight of an antenna pointing towards a GEO satellite.

52. The system of claim 51, wherein each second, third and fourth quadrant of the plane of orbit is a mirror in operation of the first quadrant, wherein a satellite of the constellation of satellites in an orbit mirrors the angular beam projections for each successive quadrant.

53. The system of claim 24, wherein said satellites operate using spectrum also employed by GEO communications satellites in the same region.

54. The system of claim 52, wherein said satellites operate using spectrum also employed by GEO communications satellites in the same region.

55. The system of claim 47, wherein the forward beam angle ψ and the rearward beam angle λ are determined at the latitude limit as a function of the latitude limit σ for a given guard band angle β around the vector between a GEO earth station and a GEO satellite at an angle γ, and wherein the satellite is in orbit at an altitude h that is at least an angle α above the local horizon.

56. The system of claim 30, wherein each satellite includes a computer having a hardware processor, and software containing instructions for instructing the computer to manipulate the beam from the satellite in the forward and rearward directions, said instructions comprising instructing the computer to:
determine the forward beam angle ψ by monitoring the satellite altitude and location coordinates for a satellite, wherein the forward beam angle ψ is the beam angle relative to a vector defined by the center of the earth and the satellite location that projects forward from the satellite in the direction of the satellite orbit;
determine the rearward beam angle λ by monitoring the satellite altitude and location coordinates for a satellite, wherein the rearward beam angle λ is the beam angle relative to a vector defined by the center of the earth and the satellite location that projects rearward from the satellite in the direction opposite to that of the satellite orbit;
identify locations of GEO earth stations that are in the line of sight of the satellite orbit; and
control the forward beam angle ψ and rearward beam angle λ to maximize coverage and to avoid transmitting down the bore sight of a GEO earth station antenna.

57. The system of claim 24, wherein the LEO satellites of the satellite constellation are distributed in orbital planes above the earth surface; wherein an LEO satellite of the constellation of satellites is distributed in the orbit relative to an adjacent LEO satellite of the constellation of satellites so that the LEO satellite and the satellite adjacent to it are within a line of sight distance between them.

58. The system of claim 24, wherein the satellites are spaced within their orbital plane at a line of sight distance, s, spacing adjacent satellites.

59. The system of claim 57, wherein the maximum line-of-sight distance spacing between satellites of the constellation of satellites is determined by the minimum angle between the horizon and a satellite at which that satellite may communicate with an earth station located at a point on the earth.

60. The system of claim 59, wherein the maximum spacing distance between adjacent satellites is determined by an angle Θ of a vector defined by the respective latitude positions of each respective adjacent satellite in a respective orbital plane, where the angle vertex is the center of the earth.

61. The system of claim 60, wherein said angle Θ is determined by the expression θ=2 ARCSIN(S/2$r_L$), wherein S is the spacing distance between adjacent satellites and is represented by the expression S=2$r_L$ SIN(θ/2).

62. The system of claim 57, wherein at least one first orbiting LEO satellite of the constellation of satellites is far enough above the local horizon to be within the line-of-sight of an LEO earth station that receives transmissions from the satellite constellation to be available for reliable communications; wherein during the period when the at least one first orbiting LEO satellite of the constellation of satellites is within a guard band around the vector between the GEO earth station and a GEO satellite, at least one second LEO satellite is within view and far enough above the local horizon, and takes over any communications function with the earth station from the first LEO satellite within the guard band vector.

63. The system of claim 60, wherein the at least one second LEO satellite taking over the communications function takes over the communications functions from the at least one first satellite prior to the first satellite turning off its transmission function at the guard band vector.

64. The system of claim 63, wherein said at least one first satellite ceases transmission when it is within the guard band vector by turning off one or more sub-beams of its transmission beam.

65. The system of claim 62, wherein the rearward beam projection of the first satellite may communicate with the earth station after the forward beam has passed the bore sight vector.

66. The system of claim 26, wherein the satellite constellation plane of orbit has four quadrants, each corresponding with a quadrant of the earth over which the orbit passes; wherein a satellite controls the forward beam angle of the forward projected beam by changing the angle of the projection as the satellite moves through its orbit in a quadrant; wherein the rearward beam of the satellite of the constellation of satellites in the next quadrant of its orbit is projected to mirror the forward beam projected by the satellite in the previous quadrant.

67. The system of claim 66, wherein said rearward projection mirroring provides a maximum region of coverage behind the satellite as the satellite travels through the quadrant.

68. The system of claim 24, wherein the beam transmitted by an LEO satellite of the constellation of satellites is in a direction opposing the direction that a GEO satellite would be transmitting to the same earth station.

69. The system of claim 24, wherein when a transmitting satellite must cease transmission to an earth station located at a point on the earth to avoid the boresight vector of an earth station GEO antenna, another satellite of the LEO satellite constellation takes over the transmission of the transmitting satellite.

70. The system of claim 24, including a plurality of earth stations configured to receive transmissions from LEO satellites and send transmissions to LEO satellites, wherein at least some of the plurality of the earth stations have omni-directional antennas.

71. The system of claim 24, including a plurality of earth stations configured to receive transmissions from LEO satellites and send transmissions to LEO satellites, wherein at least some of the plurality of the earth stations have directional antennas.

72. The system of claim 71, wherein said directional antennas are directional northerly or southerly with respect to the orbital plane of the constellation of satellites.

73. The system of claim 72, wherein said northerly or southerly directed antennas are directable in elevation and azimuth.

74. The system of claim 24, wherein said satellites operate using spectrum also employed by GEO communications satellites in the same region.

75. The system of claim 24, wherein the satellites of the satellite constellation are arranged in a sufficient number of orbital planes to provide coverage for substantially every point on earth for communications and substantially at all times.

76. The system of claim 75, wherein the satellites of the satellite constellation are positioned in multiple orbital planes at regular angular longitudinal spacing.

77. The system of claim 61, wherein the number of satellites provided in an orbital plane is determined by the distance between satellites in the orbit which are at an altitude h and at least and angle α above the horizon, and maintain a guard band angle of β around the vector between a GEO earth station and a GEO at an angle γ.

78. The system of claim 24, wherein each satellite has a plurality of antennas.

79. The system of claim 78, wherein each satellite plurality of antennas includes antennas for up/down links with earth stations and antennas for cross-links with other satellites.

80. The system of claim 79, wherein said up/down links comprise helical antennas, and wherein said cross-link antennas comprise lenses.

81. The system of claim 24, wherein the number of satellites is the minimum number of satellites and wherein the distance between satellites is the maximum distance between satellites.

82. The system of claim 24, further including a plurality of earth stations having at least one directional antenna, wherein the directional antenna's highest gain is directed to point substantially South for an earth station located in the southern hemisphere, and wherein the directional antenna's highest gain is directed to point substantially North for an earth station located in the northern hemisphere.

83. The system of claim 82, wherein the directional earth station antenna is directed to point its maximum antenna gain away from the direction of a GEO satellite and toward the direction of an LEO satellite.

84. A method for implementing communications through a satellite communication system with low earth orbiting (LEO) satellites that provide re-use of geo-stationary earth orbiting (GEO) communication satellite re-use frequencies, the method comprising:
  a) arranging a plurality of LEO satellites in a plurality of orbital planes about the earth; wherein each satellite includes equipment for transmitting RF transmissions having suitable frequencies for receipt by an earth station located on the earth;
  b) providing a control mechanism that controls the satellite RF transmissions;
  c) transmitting from an LEO satellite a transmission to an earth station;
  d) controlling the satellite transmission to avoid transmitting down the bore sight of an antenna pointing towards a GEO satellite; and
  e) wherein transmitting from an LEO satellite a transmission to an earth station is carried out using spectrum also employed by GEO communications satellites communicating in the same region.

85. The method of claim 84, wherein controlling the satellite transmission includes controlling with a control mechanism the operation of one or more antennas of the satellite to produce a transmission beam in the forward direction projected at a forward beam angle and to produce a transmission beam in the rearward direction projected at a rearward beam angle.

86. The method of claim 85, wherein controlling the beam angle comprises projecting a transmission beam in the forward direction at a forward beam angle of ψ, and wherein for a given latitude position in the satellite's orbit, the forward beam angle ψ at which the beam is projected is determined by the expression:

$$\psi = \sin^{-1}\left(\frac{r_E \sin(90 + \alpha)}{r_L}\right)$$

where $r_E$ represents the radius of the earth, where α represents the horizon elevation angle, and where $r_L$ represents the radius of the satellite's orbit.

87. The method of claim 85, wherein controlling the beam angle comprises projecting a transmission beam in the rearward direction at a rearward beam angle of angle λ, wherein for a given latitude position in the satellite's orbit the rearward beam angle λ at which the beam is projected is determined by the expression:

$$\lambda = \sin^{-1}\left(\frac{r_E \sin(90 + \gamma + \beta)}{r_L}\right)$$

where $r_E$ represents the radius of the earth, where $r_L$ represents the radius of the satellite's orbit where γ represents an acute angle between the horizon and the vector at a location of a point on earth where a GEO earth station is pointing to a geostationary satellite, and where β represents a GEO protection guard band angle around the vector between the GEO earth station and the GEO satellite to which it points, which is at angle γ to the horizon, and where $r_L$ represents the radius of the satellite's orbit.

88. The method of claim 85, wherein controlling the beam angle comprises projecting a transmission beam in the forward direction at a forward beam angle of ψ, and wherein for a given latitude position in the satellite's orbit, the forward beam angle ψ at which the beam is projected is determined by the expression:

$$\psi = \sin^{-1}\left(\frac{r_E \sin(90+\alpha)}{r_L}\right)$$

where $r_E$ represents the radius of the earth, where α represents the horizon elevation angle, and where $r_L$ represents the radius of the satellite's orbit; and wherein controlling the beam angle comprises projecting a transmission beam in the rearward direction at a rearward beam angle of angle λ, wherein for a given latitude position in the satellite's orbit the rearward beam angle λ at which the beam is projected is determined by the expression:

$$\lambda = \sin^{-1}\left(\frac{r_E \sin(90+\gamma+\beta)}{r_L}\right)$$

where $r_E$ represents the radius of the earth, where $r_L$ represents the radius of the satellite's orbit where γ represents an acute angle between the horizon and the vector at a location of a point on earth where a GEO earth station is pointing to a geostationary satellite, and where β represents a GEO protection guard band angle around the vector between the GEO earth station and the GEO satellite to which it points, which is at angle γ to the horizon, and where $r_L$ represents the radius of the satellite's orbit.

89. A low earth orbiting (LEO) satellite comprising:
a) communications equipment, said communications equipment comprising equipment for transmitting RF transmissions having suitable frequencies for receipt by an earth station located on the earth, and communications equipment for communicating with other satellites;
b) a control mechanism including a processing component and software with instructions for controlling RF transmissions from the LEO satellite to an earth station;
c) a transmitter for transmitting RF transmissions;
d) at least one antenna for projecting the RF transmissions from the LEO satellite;
e) wherein said control mechanism controls the satellite transmissions to avoid transmitting down the bore sight of an antenna pointing towards a GEO satellite; and
f) wherein the RF transmissions from the LEO satellite to an earth station are carried out using spectrum also employed by GEO communications satellites communicating in the same region.

90. The satellite of claim 89, wherein the control mechanism controls the operation of one or more antennas of the satellite to produce a transmission beam in the forward direction projected at a forward beam angle and to produce a transmission beam in the rearward direction projected at a rearward beam angle.

91. The satellite of claim 90, wherein the control mechanism controls the beam angle to project a transmission beam in the forward direction at a forward beam angle of ψ, and wherein for a given latitude position in the satellite's orbit, the forward beam angle ψ is determined by the expression:

$$\psi = \sin^{-1}\left(\frac{r_E \sin(90+\alpha)}{r_L}\right)$$

where $r_E$ represents the radius of the earth, where α represents the horizon elevation angle, and where $r_L$ represents the radius of the satellite's orbit.

92. The satellite of claim 90, wherein the control mechanism controls the beam angle to project a transmission beam in the rearward direction at a rearward beam angle of angle λ, wherein for a given latitude position in the satellite's orbit the rearward beam angle λ is determined by the expression:

$$\lambda = \sin^{-1}\left(\frac{r_E \sin(90+\gamma+\beta)}{r_L}\right)$$

where $r_E$ represents the radius of the earth, where $r_L$ represents the radius of the satellite's orbit where γ represents an acute angle between the horizon and the vector at a location of a point on earth where a GEO earth station is pointing to a geostationary satellite, and where β represents a GEO protection guard band angle around the vector between the GEO earth station and the GEO satellite to which it points, which is at angle γ to the horizon, and where $r_L$ represents the radius of the satellite's orbit.

93. The satellite of claim 90, wherein the control mechanism controls the beam angle to project a transmission beam in the forward direction at a forward beam angle of ψ, and wherein for a given latitude position in the satellite's orbit, the forward beam angle ψ is determined by the expression:

$$\psi = \sin^{-1}\left(\frac{r_E \sin(90+\alpha)}{r_L}\right)$$

where $r_E$ represents the radius of the earth, where α represents the horizon elevation angle, and where $r_L$ represents the radius of the satellite's orbit; and wherein the control mechanism controls the beam angle to project a transmission beam in the rearward direction at a rearward beam angle of angle λ, wherein for a given latitude position in the satellite's orbit the rearward beam angle λ is determined by the expression:

$$\lambda = \sin^{-1}\left(\frac{r_E \sin(90+\gamma+\beta)}{r_L}\right)$$

where $r_E$ represents the radius of the earth, where $r_L$ represents the radius of the satellite's orbit where γ represents an acute angle between the horizon and the vector at a location of a point on earth where a GEO earth station is pointing to a geostationary satellite, and where β represents a GEO protection guard band angle around the vector between the GEO earth station and the GEO satellite to which it points, which is at angle $\gamma$ to the horizon, and where $r_L$ represents the radius of the satellite's orbit.

* * * * *